(12) United States Patent
Heller et al.

(10) Patent No.: US 8,103,793 B2
(45) Date of Patent: *Jan. 24, 2012

(54) METHOD AND SYSTEM FOR UPDATING PLAYLISTS

(75) Inventors: David Heller, San Jose, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,624

(22) Filed: Oct. 20, 2009

(65) Prior Publication Data

US 2010/0042654 A1 Feb. 18, 2010

Related U.S. Application Data

(63) Continuation of application No. 10/198,639, filed on Jul. 16, 2002, now Pat. No. 7,797,446.

(51) Int. Cl.
*G06F 15/173* (2006.01)

(52) U.S. Cl. ............... 709/242; 709/219; 707/E17.109; 386/248

(58) Field of Classification Search ............ 709/219, 709/242
See application file for complete search history.

(56) References Cited

U.S. PATENT DOCUMENTS

| | | |
|---|---|---|
| 3,990,710 A | 11/1976 | Hughes |
| 4,528,643 A | 7/1985 | Freeny, Jr. |
| 4,851,931 A | 7/1989 | Parker et al. |
| 5,168,481 A | 12/1992 | Culbertson et al. |
| 5,181,107 A | 1/1993 | Rhoades |
| 5,191,573 A | 3/1993 | Hair |
| 5,341,350 A | 8/1994 | Frank et al. |
| 5,355,302 A | 10/1994 | Martin et al. |
| 5,418,713 A | 5/1995 | Allen |
| 5,428,735 A | 6/1995 | Kahl et al. |
| 5,481,509 A | 1/1996 | Knowles |
| 5,504,852 A | 4/1996 | Thompson-Rohrlich |
| 5,559,945 A | 9/1996 | Beaudet et al. |
| 5,561,604 A | 10/1996 | Buckley et al. |
| 5,566,353 A | 10/1996 | Cho et al. |
| 5,583,993 A | 12/1996 | Foster et al. |
| 5,587,404 A | 12/1996 | Kroner et al. |
| 5,616,876 A | 4/1997 | Cluts |
| 5,633,839 A | 5/1997 | Alexander et al. |
| 5,640,566 A | 6/1997 | Victor et al. |
| 5,666,530 A | 9/1997 | Clark et al. |

(Continued)

FOREIGN PATENT DOCUMENTS

EP 0 917 077 5/1999

(Continued)

OTHER PUBLICATIONS

Personal Jukebox (PJB), "System Research Center and PAAD", Compaq Computer Corp., Oct. 13, 2000, http://research.compaq.com/SRC/pjb/.

(Continued)

*Primary Examiner* — Yves Dalencourt

(57) ABSTRACT

Improved techniques for automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

18 Claims, 20 Drawing Sheets

U.S. PATENT DOCUMENTS

| | | | |
|---|---|---|---|
| 5,710,922 | A | 1/1998 | Alley et al. |
| 5,714,971 | A | 2/1998 | Shalit et al. |
| 5,721,949 | A | 2/1998 | Smith et al. |
| 5,726,909 | A | 3/1998 | Krikorian |
| 5,727,202 | A | 3/1998 | Kucala |
| 5,734,823 | A | 3/1998 | Saigh et al. |
| 5,739,451 | A | 4/1998 | Winksy et al. |
| 5,740,134 | A | 4/1998 | Peterson |
| 5,819,160 | A | 10/1998 | Foladare et al. |
| 5,835,721 | A | 11/1998 | Donahue et al. |
| 5,835,732 | A | 11/1998 | Kikinis et al. |
| 5,845,282 | A | 12/1998 | Alley et al. |
| 5,864,868 | A | 1/1999 | Contois |
| 5,875,110 | A | 2/1999 | Jacobs |
| 5,897,642 | A | 4/1999 | Capossela et al. |
| 5,918,213 | A | 6/1999 | Bernard et al. |
| 5,918,303 | A | 6/1999 | Yamaura et al. |
| 5,923,757 | A | 7/1999 | Hocker et al. |
| 5,925,843 | A | 7/1999 | Miller et al. |
| 5,926,819 | A | 7/1999 | Doo et al. |
| 5,963,916 | A | 10/1999 | Kaplan |
| 5,969,283 | A | 10/1999 | Looney et al. |
| 5,983,069 | A | 11/1999 | Cho et al. |
| 5,995,098 | A | 11/1999 | Okada et al. |
| 6,000,000 | A | 12/1999 | Hawkins et al. |
| 6,006,274 | A | 12/1999 | Hawkins et al. |
| 6,038,199 | A | 3/2000 | Pawlowski et al. |
| 6,041,023 | A | 3/2000 | Lakhansingh |
| 6,052,797 | A | 4/2000 | Ofek et al. |
| 6,061,306 | A | 5/2000 | Buchheim |
| 6,125,369 | A | 9/2000 | Wu et al. |
| 6,172,948 | B1 | 1/2001 | Keller et al. |
| 6,208,044 | B1 | 3/2001 | Viswanadham et al. |
| 6,216,131 | B1 | 4/2001 | Liu et al. |
| 6,243,328 | B1 | 6/2001 | Fenner et al. |
| 6,243,725 | B1 | 6/2001 | Hempleman et al. |
| 6,247,135 | B1 | 6/2001 | Feague |
| 6,248,946 | B1 | 6/2001 | Dwek |
| 6,255,961 | B1 | 7/2001 | Van Rzin et al. |
| 6,272,545 | B1 | 8/2001 | Flanagin et al. |
| 6,283,764 | B2 | 9/2001 | Kajiyama et al. |
| 6,295,541 | B1 | 9/2001 | Bodnar et al. |
| 6,332,175 | B1 | 12/2001 | Birrell et al. |
| 6,338,044 | B1 | 1/2002 | Cook et al. |
| 6,341,316 | B1 | 1/2002 | Kloba et al. |
| 6,356,971 | B1 | 3/2002 | Katz et al. |
| 6,380,947 | B1 | 4/2002 | Stead |
| 6,389,467 | B1 | 5/2002 | Eyal |
| 6,407,750 | B1 | 6/2002 | Gioscia et al. |
| 6,434,680 | B2 | 8/2002 | Belknap et al. |
| 6,446,080 | B1 | 9/2002 | Van Ryzin et al. |
| 6,452,609 | B1 | 9/2002 | Katinsky et al. |
| 6,453,281 | B1 | 9/2002 | Walters et al. |
| 6,490,432 | B1 | 12/2002 | Wegener et al. |
| 6,493,758 | B1 | 12/2002 | McLain |
| 6,523,124 | B1 | 2/2003 | Lunsford et al. |
| 6,529,804 | B1 | 3/2003 | Draggon et al. |
| 6,563,769 | B1 | 5/2003 | Van Der Meulen |
| 6,587,403 | B1 | 7/2003 | Keller et al. |
| 6,587,404 | B1 | 7/2003 | Keller et al. |
| 6,621,768 | B1 | 9/2003 | Keller et al. |
| 6,636,873 | B1 | 10/2003 | Carini et al. |
| 6,664,981 | B2 | 12/2003 | Ashe et al. |
| 6,665,803 | B2 | 12/2003 | Lunsford et al. |
| 6,718,348 | B1 | 4/2004 | Novak et al. |
| 6,721,489 | B1 | 4/2004 | Benyamin et al. |
| 6,731,312 | B2 | 5/2004 | Robbin |
| 6,760,721 | B1 | 7/2004 | Chasen et al. |
| 6,763,345 | B1 | 7/2004 | Hempleman et al. |
| 6,779,019 | B1 | 8/2004 | Mousseau et al. |
| 6,785,542 | B1 | 8/2004 | Blight et al. |
| 6,794,566 | B2 | 9/2004 | Pachet |
| 6,801,964 | B1 | 10/2004 | Mahdavi |
| 6,874,037 | B1 | 3/2005 | Abram et al. |
| 6,928,433 | B2 | 8/2005 | Goodman et al. |
| 6,933,433 | B1 | 8/2005 | Porteus et al. |
| 6,941,324 | B2 | 9/2005 | Plastina et al. |
| 6,978,127 | B1 | 12/2005 | Bulthuis et al. |
| 6,987,221 | B2 * | 1/2006 | Platt ............................. 84/601 |
| 7,003,495 | B1 | 2/2006 | Burger et al. |
| 7,043,477 | B2 | 5/2006 | Mercer et al. |
| 7,055,165 | B2 | 5/2006 | Connelly |
| 7,111,009 | B1 | 9/2006 | Gupta et al. |
| 7,117,516 | B2 | 10/2006 | Khoo et al. |
| 7,126,770 | B1 | 10/2006 | Arai et al. |
| 7,171,557 | B2 | 1/2007 | Kallahalla et al. |
| 7,209,633 | B1 | 4/2007 | Novak et al. |
| 7,228,298 | B1 | 6/2007 | Raines |
| 7,272,385 | B2 | 9/2007 | Mirouze et al. |
| 7,478,323 | B2 | 1/2009 | Dowdy |
| 7,502,626 | B1 | 3/2009 | Lemilainen |
| 7,797,446 | B2 * | 9/2010 | Heller et al. .................. 709/242 |
| 2001/0004310 | A1 | 6/2001 | Kono |
| 2001/0011308 | A1 | 8/2001 | Clark et al. |
| 2001/0021053 | A1 | 9/2001 | Colbourne et al. |
| 2001/0041021 | A1 | 11/2001 | Boyle et al. |
| 2001/0044835 | A1 | 11/2001 | Schober et al. |
| 2001/0048642 | A1 | 12/2001 | Berhan |
| 2001/0052123 | A1 | 12/2001 | Kawai |
| 2002/0002413 | A1 | 1/2002 | Tokue |
| 2002/0010788 | A1 | 1/2002 | Nathan et al. |
| 2002/0013784 | A1 | 1/2002 | Swanson |
| 2002/0015161 | A1 | 2/2002 | Haneda et al. |
| 2002/0016968 | A1 | 2/2002 | Nathan et al. |
| 2002/0046315 | A1 | 4/2002 | Miller et al. |
| 2002/0055934 | A1 | 5/2002 | Lipscomb et al. |
| 2002/0073167 | A1 | 6/2002 | Powell et al. |
| 2002/0080180 | A1 | 6/2002 | Mander et al. |
| 2002/0116082 | A1 | 8/2002 | Gudorf |
| 2002/0118300 | A1 | 8/2002 | Middleton et al. |
| 2002/0133515 | A1 | 9/2002 | Kagle et al. |
| 2002/0138606 | A1 | 9/2002 | Robison |
| 2002/0152278 | A1 | 10/2002 | Pontenzone et al. |
| 2002/0161865 | A1 | 10/2002 | Nguyen |
| 2002/0174269 | A1 | 11/2002 | Spurgat et al. |
| 2002/0194195 | A1 | 12/2002 | Fenton et al. |
| 2002/0194309 | A1 | 12/2002 | Carter et al. |
| 2003/0013493 | A1 | 1/2003 | Irimajiri et al. |
| 2003/0014767 | A1 | 1/2003 | Stumphauzer |
| 2003/0030733 | A1 | 2/2003 | Seaman et al. |
| 2003/0037254 | A1 | 2/2003 | Fischer et al. |
| 2003/0046434 | A1 | 3/2003 | Flanagin et al. |
| 2003/0050058 | A1 | 3/2003 | Walsh et al. |
| 2003/0055723 | A1 | 3/2003 | English |
| 2003/0074457 | A1 | 4/2003 | Kluth |
| 2003/0079038 | A1 | 4/2003 | Robbin et al. |
| 2003/0081784 | A1 | 5/2003 | Kallahalla et al. |
| 2003/0093340 | A1 | 5/2003 | Krystek et al. |
| 2003/0098893 | A1 | 5/2003 | Makinen |
| 2003/0112279 | A1 | 6/2003 | Irimajiri |
| 2003/0149628 | A1 | 8/2003 | Abbosh et al. |
| 2003/0167318 | A1 | 9/2003 | Robbin et al. |
| 2003/0182315 | A1 | 9/2003 | Plastina et al. |
| 2003/0191756 | A1 | 10/2003 | Oh |
| 2003/0206203 | A1 | 11/2003 | Ly |
| 2003/0210821 | A1 | 11/2003 | Yogeshwar et al. |
| 2003/0221541 | A1 | 12/2003 | Platt |
| 2004/0001395 | A1 | 1/2004 | Keller et al. |
| 2004/0001396 | A1 | 1/2004 | Keller et al. |
| 2004/0017997 | A1 | 1/2004 | Cowgill |
| 2004/0027930 | A1 | 2/2004 | Kudo |
| 2004/0055446 | A1 | 3/2004 | Robbin et al. |
| 2004/0076086 | A1 | 4/2004 | Keller |
| 2004/0083480 | A1 | 4/2004 | Dodge |
| 2004/0093274 | A1 | 5/2004 | Vanska et al. |
| 2004/0103102 | A1 | 5/2004 | Nelson |
| 2004/0113915 | A1 | 6/2004 | Ohtsuki et al. |
| 2004/0123242 | A1 | 6/2004 | McKibben |
| 2004/0123725 | A1 | 7/2004 | Kim |
| 2004/0128277 | A1 | 7/2004 | Mander et al. |
| 2004/0139180 | A1 | 7/2004 | White et al. |
| 2004/0148358 | A1 | 7/2004 | Singh et al. |
| 2004/0205028 | A1 | 10/2004 | Verosub et al. |
| 2004/0223245 | A1 | 11/2004 | Morohashi |
| 2004/0225762 | A1 | 11/2004 | Poo |
| 2004/0261064 | A1 | 12/2004 | Goldstein et al. |
| 2005/0055718 | A1 | 3/2005 | Stone |

| | | | |
|---|---|---|---|
| 2005/0060264 A1 | 3/2005 | Schrock et al. | |
| 2005/0080915 A1 | 4/2005 | Shoemaker | |
| 2005/0149392 A1 | 7/2005 | Gold et al. | |
| 2005/0235015 A1 | 10/2005 | Abanami et al. | |
| 2005/0240494 A1 | 10/2005 | Cue et al. | |
| 2005/0240661 A1 | 10/2005 | Heller et al. | |
| 2005/0249080 A1 | 11/2005 | Foote et al. | |
| 2005/0262528 A1 | 11/2005 | Herley | |
| 2005/0267803 A1 | 12/2005 | Patel et al. | |
| 2005/0278377 A1 | 12/2005 | Mirrashidi et al. | |
| 2006/0015378 A1 | 1/2006 | Mirrishidi et al. | |
| 2006/0036567 A1 | 2/2006 | Tan | |
| 2006/0066627 A1 | 3/2006 | Gerhard et al. | |
| 2006/0089949 A1 | 4/2006 | Robbin | |
| 2006/0100978 A1 | 5/2006 | Heller et al. | |
| 2006/0156236 A1 | 7/2006 | Heller et al. | |
| 2006/0156239 A1 | 7/2006 | Jobs | |
| 2006/0163358 A1 | 7/2006 | Biderman | |
| 2006/0168340 A1 | 7/2006 | Heller et al. | |
| 2006/0247920 A1 | 11/2006 | Mirrashidi et al. | |
| 2008/0256378 A1 | 10/2008 | Guillorit | |
| 2009/0063496 A1 | 3/2009 | Cunningham et al. | |
| 2009/0063543 A1 | 3/2009 | Martin et al. | |

FOREIGN PATENT DOCUMENTS

| | | | |
|---|---|---|---|
| EP | 0 982 732 | | 3/2000 |
| EP | 1 028 425 | | 8/2000 |
| EP | 1 056 093 | | 11/2000 |
| EP | 1 548 740 | | 6/2005 |
| JP | 2000-339917 | | 12/2000 |
| JP | 2001-76465 | | 3/2001 |
| JP | 2001-93226 | | 4/2001 |
| JP | 2001-117800 | | 4/2001 |
| JP | 2001/291365 | A | 10/2001 |
| JP | 2002/74909 | A | 3/2002 |
| WO | WO 95/16950 | | 6/1995 |
| WO | WO 01/33569 | | 5/2001 |
| WO | WO 01/67753 | | 9/2001 |
| WO | WO 02/25610 | | 3/2002 |
| WO | WO 02/25935 | | 3/2002 |
| WO | WO 03/023786 | | 3/2003 |
| WO | WO 03/25933 | | 3/2003 |
| WO | WO 2004-004338 | | 1/2004 |
| WO | WO 2004/084413 | | 9/2004 |
| WO | 2005073856 | A2 | 8/2005 |

OTHER PUBLICATIONS

Etchison, "Accelerated Discrete Adjustment of the Parameters of a Process", IBM Technical Disclosure Bulletin, vol. 15, No. 5, Oct. 1, 1972, 2 pgs.

Notification for Reason for Rejection for Japanese Patent Application 2004-521604, mailed Mar. 9, 2010 (with translations).

Office Action for U.S. Appl. No. 10/198,639, mailed Dec. 2, 2005.

Final Office Action for U.S. Appl. No. 10/198,639, mailed May 4, 2006.

Advisory Action U.S. Appl. No. 10/198,639, mailed Aug. 25, 2006.

Office Action for U.S. Appl. No. 10/198,639, mailed Jan. 3, 2007.

Final Office Action for U.S. Appl. No. 10/198,639, mailed Jun. 12, 2007.

Office Action for U.S. Appl. No. 10/198,639, mailed Oct. 3, 2007.

Notice of Allowance for U.S. Appl. No. 10/198,639, mailed Apr. 2, 2010.

Summons to Attend Oral Proceedings for European Patent Application No. 03764426.7, mailed Jun. 9, 2010.

"Apple Announces iTunes 2," Press Release, Apple Computer, Inc., Oct. 23, 2001.

"Apple Introduces iTunes—World's Best and Easiest to Use Jukebox Software," Macworld Expo, San Francisco, Jan. 9, 2001.

"Apple's iPod Available in Stores Tomorrow," Press Release, Apple Computer, Inc., Nov. 9, 2001.

"Hewlett Packard Jornada 525 Color Pocket PC," downloaded Jan. 25, 2002, http://www.pc4d.com/electronics/products/56/jornada_525_color_pocket_pc.shtml.

"Nomad Jukebox," User Guide, Creative Technology Ltd., Version 1, Aug. 2000.

"Replay Gain—A proposed Standard," Oct. 7, 2001, from http://replaygain.hydrogenaudio.org/index.html and http://replaygain.hydrogenaudio.org/outline.html.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"About MusicMatch Jukebox," MusicMatch Jukebox v4 Help, 1999, pp. 1-4.

"iTunes Celebrates its First Anniversary; Over 70 Million Songs Purchased," Apr. 28, 2004, http://www.apple.com/pr/library/2004/apr/28itunes.html.

"Rio Portable Music Player," Independent Web Review, downloaded Jan. 25, 2002, http://www.webreviews.com/9901/rio.html.

Birrell, Andrew, "Personal Jukebox (PJB)," Oct. 13, 2000, http://birrell.org/andrew/talks/pjb-overview.ppt.

Breen, Christopher, "iMixing it Up: Sharing Your Sounds," Sep. 17, 2004, http://playlistmag.com/help/2004/09/imixhowto/index.php.

Bridgman, "Windows XP Expert Zone Community Columist", Using Windows Mobil-based Portable Media Centers and Windows Media Player 10, Aug. 25, 2004, 1-11.

Butler, Travis, "Archos Jukebox 6000 Challenges Nomad Jukebox," Aug. 13, 2001, http://db.tidbits.com/getbits.acgi?tbart=06521.

Butler, Travis, "Portable MP3: The Nomad Jukebox," Jan. 8, 2001, http://db.tidbits.com/getbits.acgi?tbart=06261.

Chakarova et al., "Digital Still Cameras—Downloading Images to a Computer," Multi-Media Reporting and Convergence, 2 pgs.

Compaq Computer Corp., copyright 1991, Personal Jukebox User Manual, pp. 1-29.

Compaq, "Personal Jukebox," Jan. 24, 2001, http://research.compaq.com/SRC/pjb/.

De Herrera, Chris, "Microsoft ActiveSync 3.1," Version 1.02, Oct. 13, 2000.

Engst, Adam C., "SoundJam Keeps on Jammin'," Jun. 19, 2000, http://db.tidbits.com/getbits.acgi?tbart=05988.

Fleishman, Glenn, "Handheld iPod joins MP3 band a bit late, but is standout player," Nov. 6, 2001, http://seattletimes.nwsource.com/html/businesstechnology/134361811_ptmacc040.html.

Handbook for Palm™ m500 Series Handhelds, User Manual, copyright 1998-2001.

IEEE 1394—Wikipedia, 1995, http://www.wikipedia.org/wiki/Firewire.

iTunes 2, Playlist Related Help Screens, iTunes v2.0, Apple Computer, Inc., Oct. 23, 2001.

iTunes, Digital Music for your Mac, Apple Computer, Inc., downloaded Oct. 22, 2001, http://www.apple.com/itunes/.

iTunes, Playlist Related Help Screens, iTunes v1.0, Apple Computer, Inc., Jan. 2001.

Kawamoto et al., "On 1$^{st}$ Birthday, iTunes Unwraps New Features," Apr. 28, 2004, http://news.com.com/On+1st+birthday,+iTunes+unwraps+new+features/2100-1027_3-5201598.html.

Lindauer, Andy, "What's in your Pocket?," Edgereview, downloaded Jan. 25, 2002, http://www.edgereview.com/print.cfm?Type=aag&ID=286.

Lyra, Personal Digital Player, RCA, Product Box, (2003).

Miniman, "Applian Software's Replay Radio and Player v1.02," Product review, pocketnow.com, http://www.pocketnow.com/reviews/replay/replay.htm, Jul. 31, 2001.

*Musicmatch*, "Musicmatch and Xing Technology Introduce Musicmatch Jukebox," May 18, 1998, http://www.musicmatch.com/info/company/press/releases/?year=1998&release=2.

Office Action from European Patent Office for European Patent Application No. 03764426.7 dated Nov. 8, 2005.

*RCA Lyra User's Guide*, RD2201/2202/2204, www.lyrazone.com, (1999) pp. 1-37.

RealJukebox Plus Manual, Real Networks, Inc., copyright 1999, pp. 1-83.

*RealJukebox, Real Networks, Inc.*, webpages downloaded Oct. 27, 2005 http://www.real.com/Jukebox/release_notes.html#.

Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
TuneBase 100 User Guide, A CD Library Management System, Escient, Inc. copyright 1999.
TuneBase Pro Mk-II User's Guide, Escient, Inc. (1999).
U.S. Appl. No. 10/198,639, filed Jul. 16, 2002.
U.S. Appl. No. 10/833,399, filed Apr. 27, 2004.
U.S. Appl. No. 10/833,879, filed Apr. 27, 2004.
U.S. Appl. No. 10/936,233, filed Sep. 7, 2004.
U.S. Appl. No. 10/973,925, filed Oct. 25, 2004.
U.S. Appl. No. 11/097,034, filed Apr. 1, 2005.
U.S. Appl. No. 11/097,591, filed Apr. 1, 2005.
U.S. Appl. No. 11/138,004, filed May 25, 2005.
U.S. Appl. No. 11/114,914, filed Apr. 25, 2005.
U.S. Appl. No. 11/454,060, filed Jun. 14, 2006.
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
PBS Local Insertion Server Instruction Manual, Microvision, Inc., pp. 1-71, Jun. 19, 1996.
Wave Station Digital Audio Automation System, Instruction & Operations Manual Broadcast Software International, pp. 1-113, Feb. 4, 1997.
Nielsen et al., "Comparative Design Review: An Exercise in Parallel Design", Interchi '93, pp. 414-417Apr. 24-29, 1993.
Lowery Daryl, "Random-Access Digital Audio—Recording Systems", p. 68-71, Jun. 1992.
Sadie Master System, Product Brochure, Studio audio Digital Equipment Inc., 2 pgs., Jan. 1995.
RCS Works-Cart Wall User's Guide and Reference Manual, pp. 1-83, Feb. 7, 1993.
"Digital Audio Just Got Easier!", CartWorks Digital Audio Systems, dbm Systems, Inc., Jun. 26, 1996.
"CartWorks File Utilities User's Manual", dbm Systems, Inc., pp. 1-8., Jul. 1998.
"CartWorks MHD Music-on-Hard-Drive QuickSchedule User's Manual", dbm Systems, Inc., pp. 1-8, Feb. 8, 1998.
"CartWorks MHD Music-on-Hard-Drive User's Manual V6.8", dbm Systems, Inc., pp. 1-11, Feb. 1998.
"CartWorks On-Demand Editor User's Manual", dbm Systems, Inc., pp. 1-7., Feb. 1998.
"CartWorks Script Editor User's Manual v3.12", dbm Systems, Inc., pp. 1-26., Feb. 1998.
"CartWorks Spot Set Editor User's Manual", dbm Systems, Inc., pp. 1-11., Feb. 1998.
"The DADpro Digital Audio Delivery System Operation Manual Version 1.0", IBM Corp., pp. 1-424, Aug. 30, 1996.
"Virtual Recorder—Basic Operations", ASC Audio Video Corporation, pp. 1-94, Sep. 9, 1996.
"Broadcast Tools: SpotBase, Playlist & TapeBase", ASC Audio Video Corporation, pp. 1-2., Mar. 1998.
"VR 300 Advanced Broadcast Video Server", ASC Audio Video Corporation, pp. 1-9., Mar. 1998.
"VR300 Video Server User Manual, Version 1.0", ASC Audio Video Corporation, pp. 1-40, Mar. 20, 1998.
"Gravis WinDecks Version 1.12", screen shots, Gravis Computer Technology Ltd., pp. 1-10., Jan. 1990.
WinDecks, User Instructions, Gravis Computer Technology Ltd., pp. 1-14., Jan. 1990.
Iriver, "PMP140/120", Sep. 13, 2004, 1-2 pgs.
MG-25, Portable MPEG4 Player (MG-25), Jul. 29, 2004, 1-3 pgs.
Windows XP Service Pack 2, Figures 1-2 and "How to obtain the latest Windows XP service pack," Aug. 25, 2004.
Office Action from European Patent Office for 03764426.7 mailed Aug. 14, 2006.
Torrone, Phillip, How-To: Getting Podcasts on a Portable Media Center (and other Windows Media Devices, Oct. 2004.
Office Action for European Patent Office for 03764426.7 mailed Sep. 11, 2009.
Notification of Reason for Rejection for Japanese Patent Application 2004-521604, mailed Apr. 15, 2008 (with translation).
Notification for Reason for Rejection for Japanese Patent Application 2004-521604, mailed Jun. 16, 2009 (with translations).
Written Opinion for PCT/US03/21534 mailed Mar. 12, 2004.
International Preliminary Examination Report for PCT/US/21534 mailed Jun. 8, 2004.
Minutes of the Oral Proceedings for EP Patent Application No. 03764426.7, dated Jan. 26, 2011.
Office Action (Questioning) for Japanese Patent Application No. 2004-521604, dated May 17, 2011 (with translations).

* cited by examiner

FIG. 11B

METHOD AND SYSTEM FOR UPDATING PLAYLISTS

CROSS-REFERENCE TO RELATED APPLICATION

This application is a continuation of U.S. application Ser. No. 10/198,639, filed Jul. 16, 2002, and entitled "METHOD AND SYSTEM FOR UPDATING PLAYLISTS," now U.S. Pat. No. 7,797,446, which is hereby incorporated herein by reference.

BACKGROUND OF THE INVENTION

1. Field of the Invention

The present invention relates to media systems and, more particularly, to media systems that support playlists.

2. Description of the Related Art

Media systems have permitted users to create playlists of audio tracks (i.e., songs) that are to be played. Typically, the media systems store a large library of audio tracks. Hence, the ability for a user to create their own playlists assists the user in playing those of the audio tracks from the library they prefer.

Conventionally, playlists have been created either by a drag-and-drop operation or by rules. A representative example of drag-and-drop playlist creation is the playlist creation of iTunes, version 1.0, from Apple Computer, Inc. of Cupertino, Calif. A representative example of a rules-based playlist creation is the playlist composer of SoundJam MP Plus published by Casady & Greene, Inc. of Salinas, Calif.

In the case of the drag-and-drop operation, the user selects one or more certain audio tracks from a list of audio tracks in a library. Then, the selected one or more tracks are dragged into a playlist. This drag-and-drop operation can be repeated until all the desired audio tracks have been dragged into the playlist. Later, such as after the audio tracks in the library are changed, the user can drag new audio tracks into or delete tracks from the playlist. Thus, the drag-and-drop operation requires user interaction and is particularly cumbersome for media systems that have a large library of audio tracks to choose from.

In the case of a playlist that is defined by rules, the playlist is created by a computing device selecting those of the audio tracks in the library that satisfy the rules. The user specifies the rules for the playlist. The rules are the criteria that are used to determine whether the audio tracks are to be included in the playlist. For example, a rule could include in the playlist all audio tracks listing "Pink Floyd" as artist. When the rules are processed by the computing device, the audio tracks satisfying the rules are placed in the playlist. Although the creation of the playlist is automated after the user specifies the appropriate rules, the playlist that is created is fixed. Unfortunately, since the audio tracks in libraries often change (e.g., new audio tracks added), the playlist that has been created soon becomes unreliable. For example, the playlist could easily not include certain of the subsequently added audio tracks in the library that satisfy the rules for the playlist. A user would be forced to either manually perform drag-and-drop operations with respect to the playlist or manually again specify rules and create a new playlist in order to have the playlist include all the audio tracks within the library that satisfy the rules for the playlist.

Thus, there is a need for improved techniques to maintain playlists within media systems.

SUMMARY

Broadly speaking, the invention relates to automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

The invention can be implemented in numerous ways including as a method, system, device, apparatus, and computer readable medium. Several embodiments of the invention are discussed below.

As a computer readable storage medium including at least computer program code stored thereon for automatically updating a list of media items maintained by a media system, one embodiment of the invention can, for example, include at least: computer program code for automatically determining whether at least one new media item has been added to a media content library available to the media system; computer program code for determining whether the list of media items is affected by the addition of the at least one media item to the media content library available to the media system; and computer program code for regenerating the list of media items when the computer program code for determining determines that at least one new media item has been added to the media content library available to the media system. The computer program code for regenerating operates to regenerate the list of media items after the computer program code for determining determines that the list of media items is affected by the addition of the at least one media item to the media content library available to the media system.

As a computer readable storage medium including at least computer program code stored thereon for providing an updated playlist from a client computer to a portable media player, one embodiment of the invention can, for example, include at least: computer program code for determining whether an updated playlist is available to be provided from a client computer to the portable media player; and computer program code for electronically delivering the updated playlist from the client computer to the portable media player when a data connection is available between the client computer and the portable media player. The updated playlist is maintained at the client computer. The client computer is configured to automatically (i) determine whether at least one new media item has been added to a media content library, (ii) determine whether the dynamic playlist is affected by the addition of the at least one media item to the media content library, and (iii) regenerate the dynamic playlist when it is determined that the dynamic playlist is affected by the addition of the at least one media item to the media content library.

As a computer-implemented method for automatically updating a playlist on a media play system, the method being performed by the media play system which includes a processor and a memory, one embodiment of the invention can, for example, include at least: determining whether new media content has been added to a media content library available to the media play system; determining whether the playlist is affected by the addition of the new media content to the media content library available to the media play system; and automatically regenerating the playlist when the determining determines that the new media content has been added to the media content library available to the media play system. The regeneration is performed after it is determined that the new media content has been added to the media content library available to the media play system and after it is determined that the playlist is affected by the addition of the new media content to the media content library available to the media play system.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 11A and 11B are screen shots of media items of exemplary playlists formed using the graphical user interface shown in FIG. 10B.

DETAILED DESCRIPTION OF THE INVENTION

The invention relates to automatic (or dynamic) updating (or maintaining) of playlists for a media system that stores and plays media content for a user of the media system. The automatic update to playlists can occur when additional media content is added to or removed from the media system. The automatic update to playlists can also occur when previously stored media content is otherwise altered.

Embodiments of the invention are discussed below with reference to FIGS. 11A-11B. However, those skilled in the art will readily appreciate that the detailed description given herein with respect to these figures is for explanatory purposes as the invention extends beyond these limited embodiments.

Figure 1A:
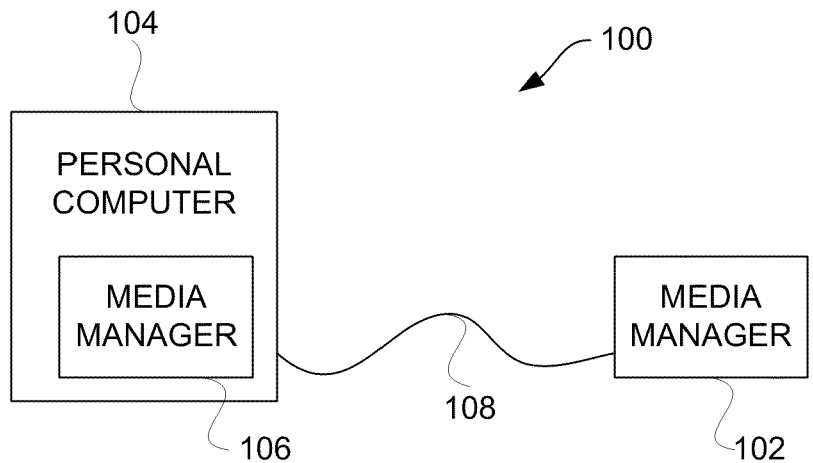
FIG. 1A is a block diagram of a media management system according to one embodiment of the invention.

FIG. 1A is a block diagram of a media management system 100 according to one embodiment of the invention. The media management system 100 includes a media player 102 and a personal computer (host computer) 104. The media player 102 is, for example, a portable, battery-operated device. In one embodiment, the media player 102 is an MP3 player. The personal computer 104 includes a media manager 106. The media manager 106 enables a user of the personal computer 104 to directly manage media content stored on the personal computer 104. The media manager 106 may also indirectly manage media content stored on the media player 102. A peripheral cable 108 couples the media player 102 to the personal computer 104. Typically, the peripheral cable 108 couples data ports provided on the media player 102 and the personal computer 104. In one example, the data ports can be FIREWIRE ports and the peripheral cable 108 can be a FIREWIRE cable. More generally, the peripheral cable 108 acts as a data link. Media items can be transferred from the media player 102 to the personal computer 104 over the peripheral cable 108, and vice-versa.

The media manager 106 facilitates browsing, adding, deleting, organizing, and other operations with respect to media content (e.g., numerous media items) on the personal computer 104. More particularly, the media manager 106 assists a user in organizing media items into one or more playlists. A playlist is a list of media items that are to be "played." Depending on the type of media involved, the manner in which a media item is "played" can vary. According to the invention, a playlist is able to be automatically updated subsequent to its initial creation. Those playlists that are automatically updated can be referred to as dynamic playlists. In other words, a dynamic playlist is a playlist that is to be automatically updated as appropriate when its underlying data source is altered. A non-dynamic playlist is a playlist that is fixed on creation (i.e., not updated) regardless of changes to its underlying data source. In either case, manual user actions can typically be used to alter the playlists.

According to one embodiment, a user can form playlists manually by a drag-and-drop operation or automatically from user-provided rules. In such an embodiment, the rules-based playlists can be automatically updated (i.e., dynamic playlists), whereas other playlists that are not rules-based cannot be automatically updated (i.e., non-dynamic playlists).

Additionally, the media manager 106 can also assist a user in adding and removing media content or playlists with respect to the media player 102. In other words, although the media manager 106 resides on the personal computer 104, at least certain management action taken with respect to the media manager 106 can cause the media content or playlists at the media player 102 to be similarly managed. For example, the media manager 106 can synchronize the media content and the playlists between the personal computer 104 and the media player 102.

The media management system 100 need not include the media player 102 as the media manager 106 can manage media content residing on the personal computer 104. Hence, the media player 102 and its peripheral cable 108 can be considered optional components of the media management system 100.

Nevertheless, in one embodiment, the media player is a portable computing device dedicated to processing media such as audio, video or images. For example, the media player 102 can be a music player (e.g., MP3 player), a game player, a video player, a video recorder, a camera, an image viewer, and the like. These devices are generally battery-operated and highly portable so as to allow a user to listen to music, play games or video, record video or take pictures wherever the user travels. In one implementation, the media player is a hand-held device that is sized for placement into a pocket or hand of the user. By being hand-held, the media player is relatively small and easily handled and utilized by its user. By being pocket-sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Figure 1B:
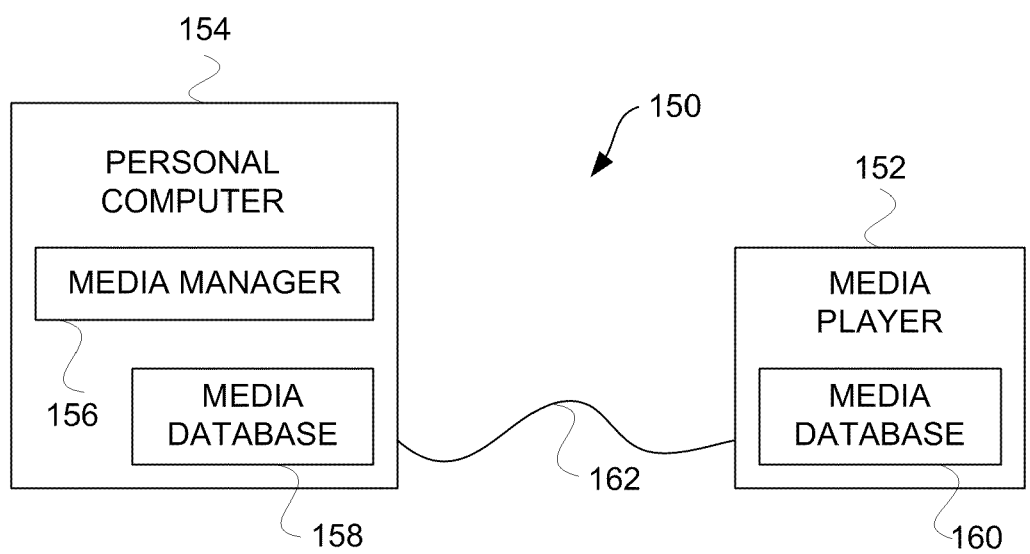
FIG. 1B is a block diagram of a media synchronization system according to one embodiment of the invention.

FIG. 1B is a block diagram of a media synchronization system 150 according to one embodiment of the invention. The media synchronization system 150 can, for example, represent one embodiment of the more general media management system 100 illustrated in FIG. 1A. The media synchronization system 150 includes a media player 152 and a personal computer 154. The personal computer 154 includes a media manager 156. The personal computer 154 further includes a media database 158. The media player 152 includes a media database 160. Typically, the media player 152 will also include a data storage device (e.g., disk drive) for storing media content, a cache memory for storing media content in-use, a screen display for displaying information to a user, and a processor (e.g., microprocessor) for controlling operation of the media player 152.

A peripheral cable 162 provides a data path (or data link) between the media player 152 and the personal computer 154. The peripheral cable 162 provides a peripheral bus that couples the media player 152 to the personal computer 154. The peripheral bus, for example, could be a FIREWIRE bus or a Universal Serial Bus (USB). A synchronization operation between the media content stored on the personal computer 154 and the media content stored on the media player 152 can be achieved in a sophisticated manner through comparison of media information stored in the respective media databases 158 and 160. When comparison of the media information from the respective databases 158 and 160 indicates that there is a particular media item resident on the personal computer 154 that is not resident on the media player 152, then the particular media item can be transmitted (downloaded) to the media player over the peripheral cable 162. On the other hand, when the comparison of the media information from the respective databases 158 and 160 indicates that a particular media item is resident on the media player 152 but is not resident on the personal computer 154, then the particular media item can be either removed (deleted) from the media player 152 or transmitted (e.g., uploaded) over the peripheral cable 162 to the personal computer 154. Hence, by providing the media player 152 with the media database 160, more sophisticated synchronization and management of media content is enabled.

The media database 160 also allows the media player 152 to present a user interface to the user that is more sophisticated than conventional approaches. Such a user interface can be presented on the screen display of the media player 152. The user interface can, for example, allow the user of the media player 152 to browse, sort, search, play, etc. the media content resident on the media player 152. The user interface can also allow the user of the media player 152 to download (add) or delete (remove) media items from the media player 152. The media manager 156 also has a user interface that allows a user to browse, sort, search, play, make playlists, burn Compact Discs (CDs), etc. the media content resident on the personal computer 154. The user interface can also allow the user of the personal computer 154 to download (add) or delete (remove) media items from the personal computer 154. In one embodiment, the media manager 156 and its associated user interface are provided by iTunes, version 2.0, from Apple Computer, Inc. of Cupertino, Calif.

Figure 2:
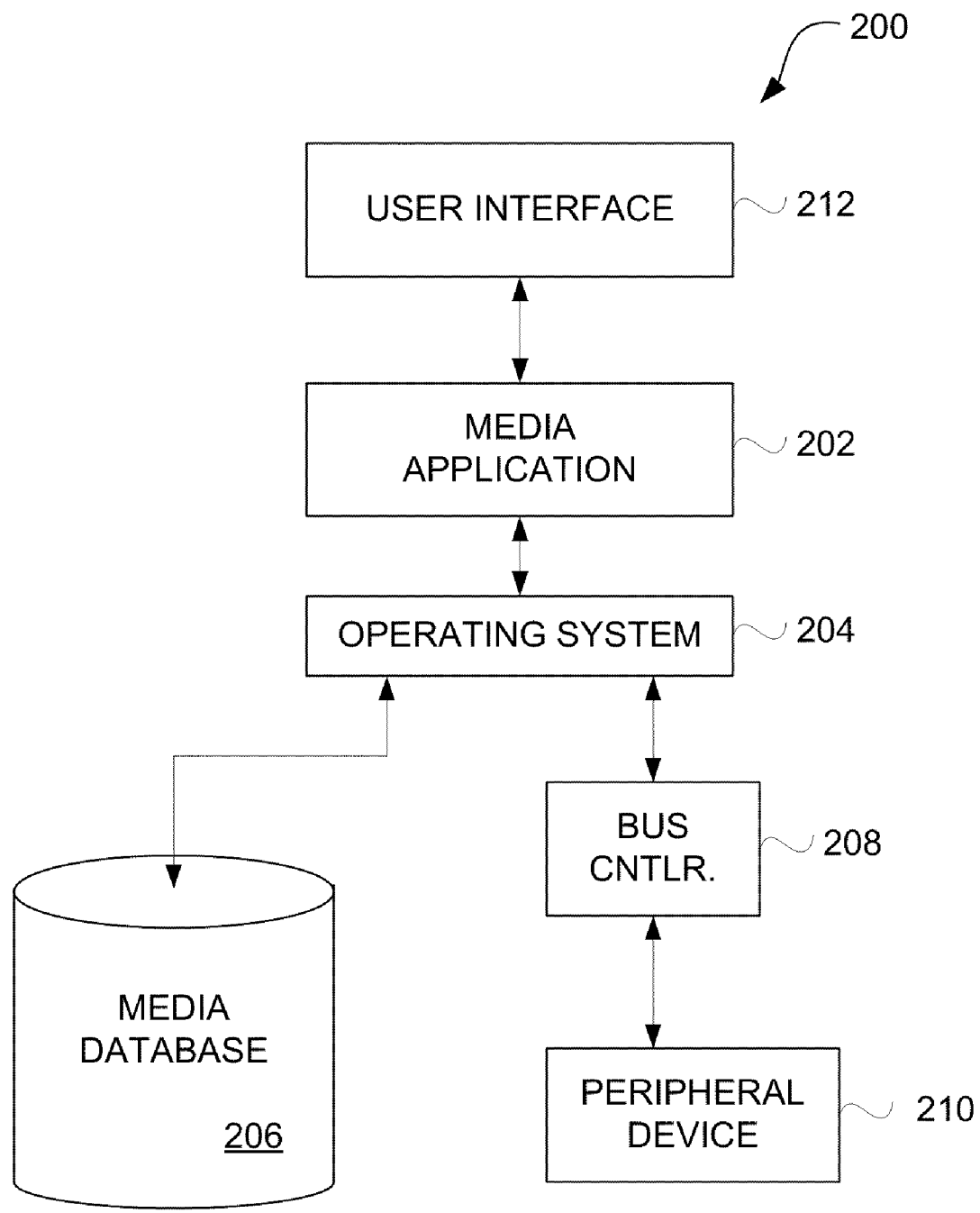
FIG. 2 is a block diagram of program architecture according to one embodiment of the invention.

FIG. 2 is a block diagram of program architecture 200 according to one embodiment of the invention. The program architecture 200 is used to update playlists (i.e., dynamic playlists) in accordance with one embodiment of the invention. The program architecture 200 is centered about a media application 202. The media application 202 permits users to store and play media items, as well as to create and utilize playlists composed of one or more particular media items. The media application 202 couples to an operating system 204. The operating system 204 in turn couples to a media database 206 that stores media items to be utilized by the media application 202. The media database 206 also stores playlists that have been created by the media application 202. The media application 202 also operates to update one or more playlists that are stored within the media database 206. The program architecture 200 also includes a bus controller 208 that couples a peripheral device 210 to the operating system 204. Here, the peripheral device 210 can be utilized to provide another data source for the media application 202.

Figure 3A:
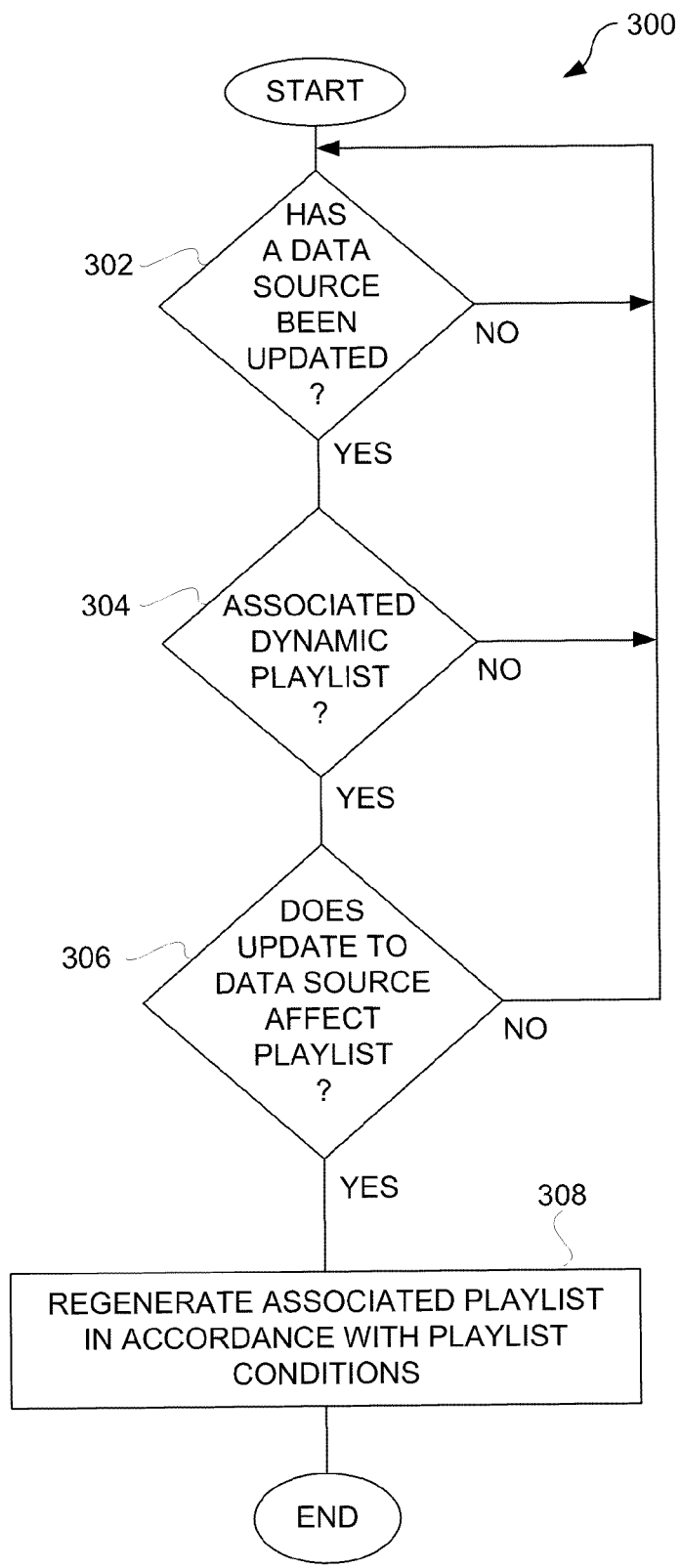
FIG. 3A is a flow diagram of update playlist processing according to one embodiment of the invention.

FIG. 3A is a flow diagram of update playlist processing 300 according to one embodiment of the invention. The update playlist processing 300 can be performed on a media play system offering playlist support. For example, the media play system can be a computing device, such as a personal computer.

The update playlist processing 300 begins with a decision 302 that determines whether a data source has been updated. Here, a data source pertains to a source of media content, namely, media items. Examples of data sources are a compact disc (CD), a portable media player, a remote server through the Internet, or a local disk drive. When the decision 302 determines that a data source has not been updated, then no modifications, additions or deletions to the media content or media items associated with the media play system have been made, thus the update playlist processing 300 returns to repeat the decision 302.

On the other hand, once the decision 302 determines that a data source has been updated, then a decision 304 determines whether there is a dynamic playlist is associated with the data source. A dynamic playlist is a playlist that is to be updated as appropriate when its underlying data source is altered. When the decision 304 determines that there is no dynamic playlist associated with the data source, then the update playlist processing 300 returns to repeat the decision 302 and subsequent blocks. In other words, when there is no dynamic playlist associated with the data source, then the balance of the update playlist processing 300 need not be performed.

Alternatively, when the decision 304 determines that there is a dynamic playlist associated with the data source, then a decision 306 determines whether the update to the data source affects the dynamic playlist. When the decision 306 determines that the update to the data source does not affect the dynamic playlist, then the update playlist processing 300 returns to repeat the decision 302 and subsequent blocks. Here, the playlist is dynamic and associated with the data source, but since the alternations to the data source do not impact the dynamic playlist, the balance of the update playlist processing 300 need not be performed.

When the decision 306 determines that the update to the data source does affect the dynamic playlist, then the dynamic playlist is regenerated 308 in accordance with playlist conditions. The playlist conditions specify rules or criteria utilized in determining the media items of the data source that are to be included in the dynamic playlist. The playlist conditions are thus associated with a particular dynamic playlist. After the dynamic playlist has been regenerated 308, the update playlist processing 300 is complete and ends with the dynamic playlist having been regenerated.

The decision 306, if implemented, is used to improve performance efficiency. Namely, the decision 306 allows the regeneration 308 of the dynamic playlist to be avoided when the updates to the data source would not cause the dynamic playlist to change if it were regenerated. Hence, if desired, the decision 306 can be approximated or even eliminated in other embodiments. Additionally, if the dynamic playlist were being displayed on a display screen associated with the media player when the regeneration 308 was performed, then the displayed dynamic playlist could be re-drawn so as to reflect the regenerated version of the dynamic playlist.

Figure 3B:
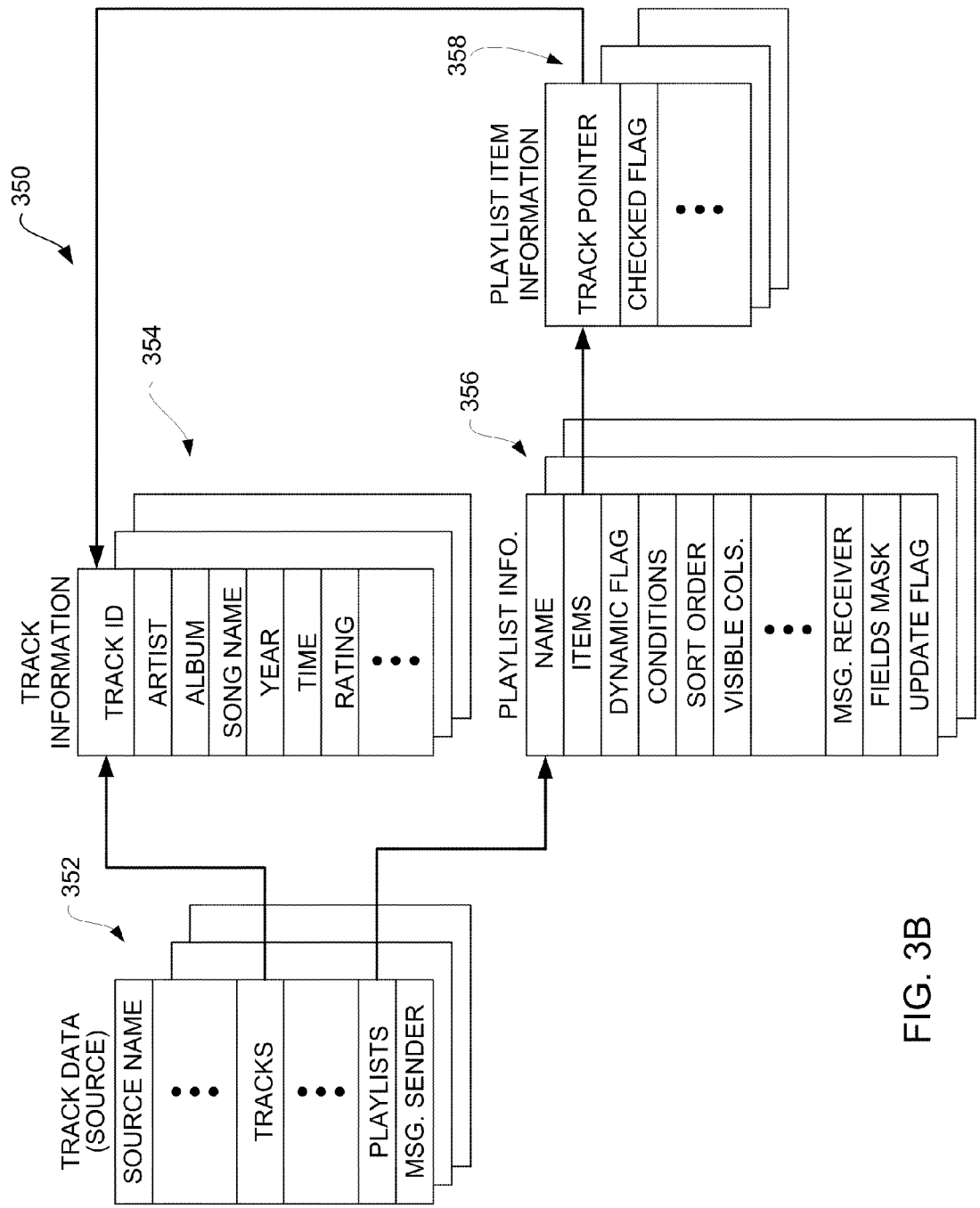
FIG. 3B is a diagram of a media database arrangement in accordance with one embodiment of the invention.

FIG. 3B is a diagram of a media database arrangement 350 in accordance with one embodiment of the invention. The media database arrangement 350 is, for example, suitable for use with the media database 206 illustrated in FIG. 2.

The media database arrangement 350 stores track data 352 for each data source provided by a media system (e.g., media play system). The track data for a particular data source can include various descriptive data such as source name, tracks and playlists. The track data 352 can also include a message sender that serves to distribute messages to message receivers when modifications, additions or deletions have been made with respect to the track data 352. The tracks of the track data 352 point to track information 354. The track information 354 contains various fields that provide descriptive information about particular tracks. For example, for a particular track, the track information 354 can include a track identifier (ID), artist, album, song name, year, time, rating, etc. The playlists within the track data 352 can point to those playlists that are associated with the track data 352. More particularly, the playlists within track data 352 can point to playlist information 356 pertaining to particular playlists. The playlist information 356 includes various descriptive information for each playlist. As an example, the playlist information 356 can include name, items, dynamic flag, conditions, sort order, visible columns, etc. The dynamic flag indicates whether or not the associated playlist is to be dynamic.

Still further, the playlist information 356 can include a message receiver (that receives messages from the message sender), a fields mask, and an update flag. The items within the playlist information 356 point to playlist item information 358 for particular items within a playlist. The playlist item information 358 includes at least a track pointer to a particular track in the track information 354. Hence, the track pointer within the playlist item information 358 provides the pointer to the track information 354 such that the media content (file) that is to be associated with a particular item in a playlist is able to be identified and retrieved. The playlist item information 358 can also include one or more playlist-specific fields to provide specific information to be associated with particular items within a playlist. As an example, the playlist item information 358 shown in FIG. 3 includes a checked flag that is used in one embodiment of the invention to allow a user to check or uncheck particular items within a playlist such that they are enabled or disabled from being used when the media content of the playlist is played.

Figure 4:
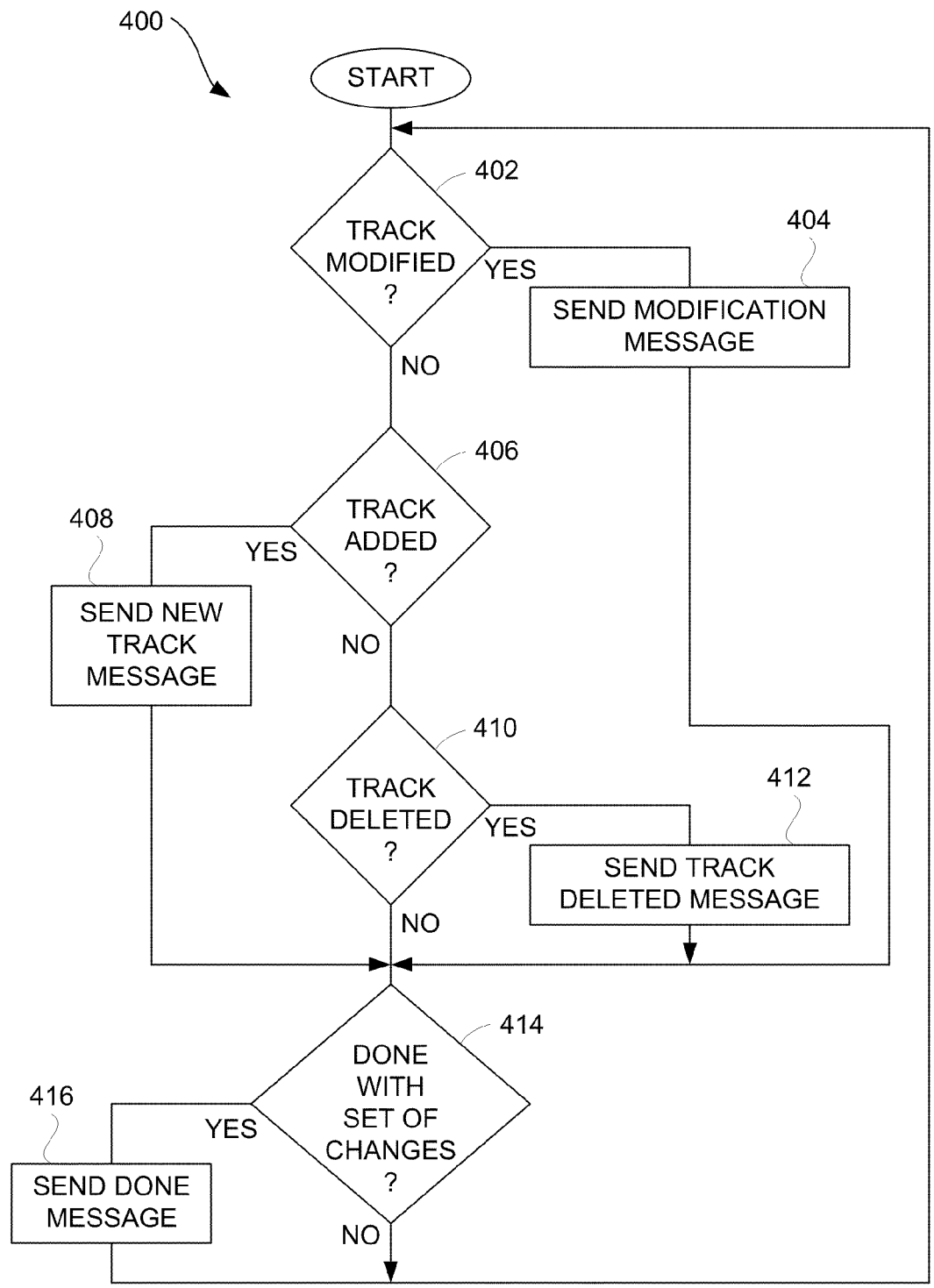
FIG. 4 is a flow diagram of inter-process messaging according to one embodiment of the invention.
Figure 5A:
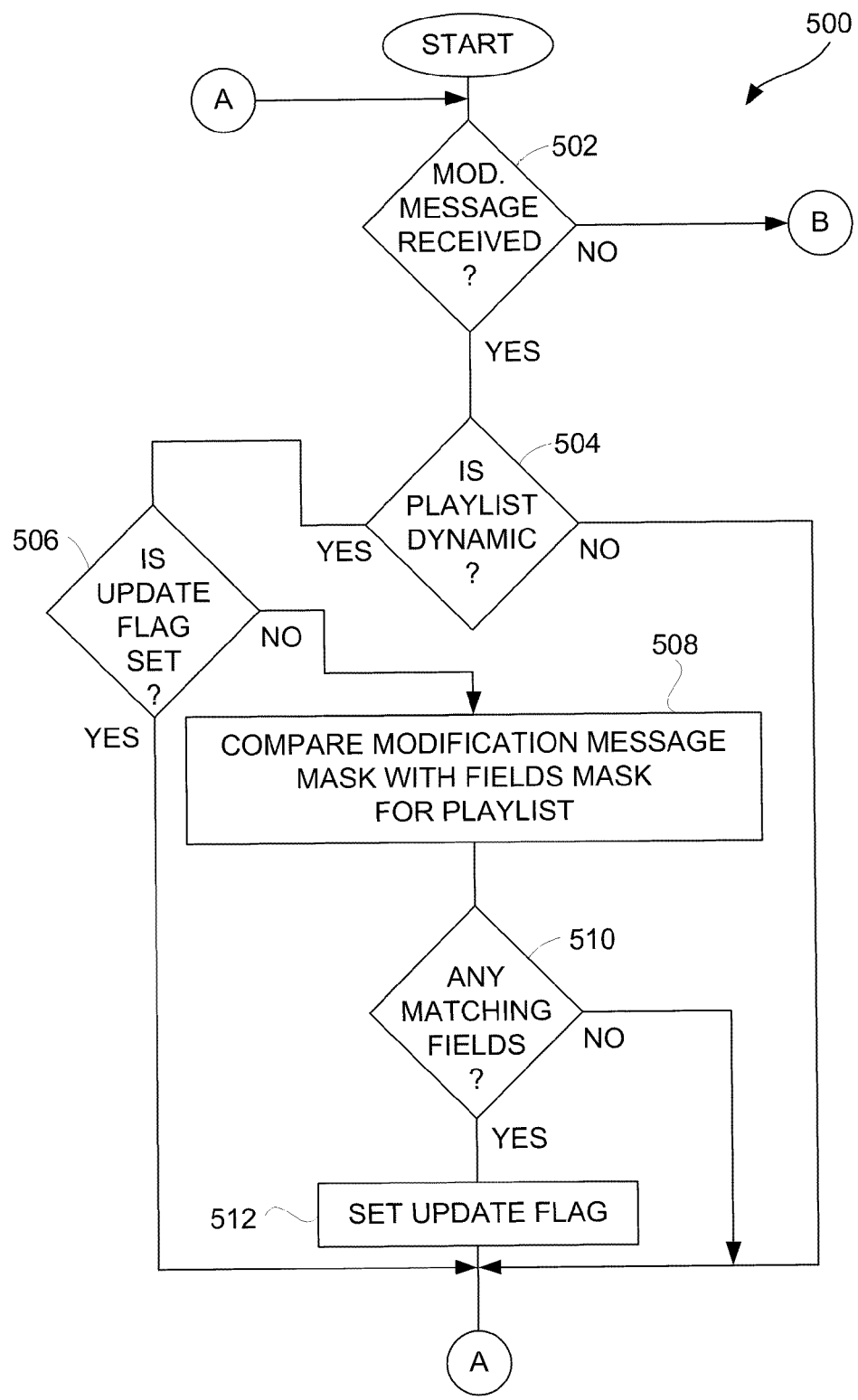
FIGS. 5A-5D are flow diagrams of message update processing according to one embodiment of the invention.
Figure 5B:
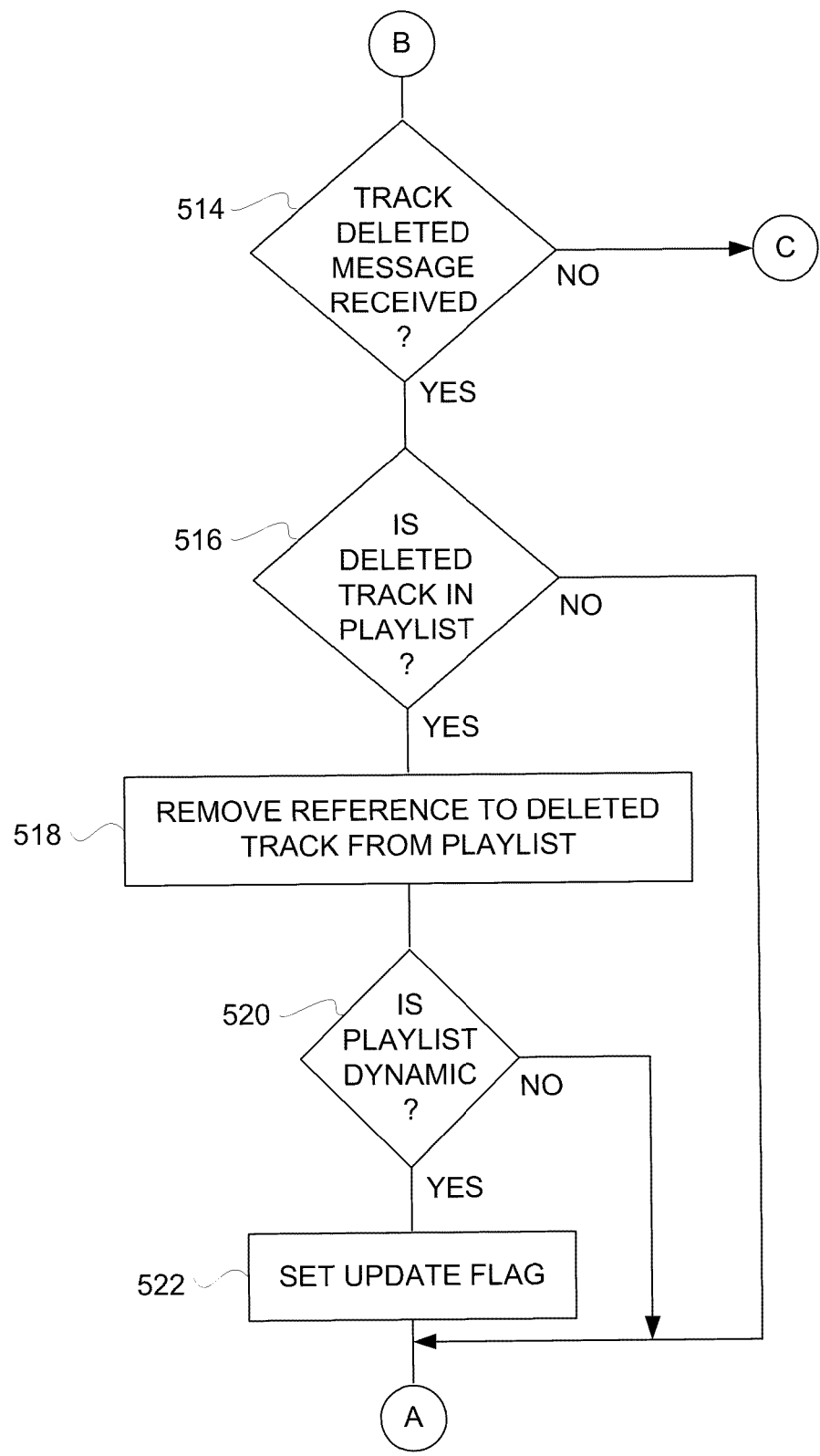
Figure 5C:
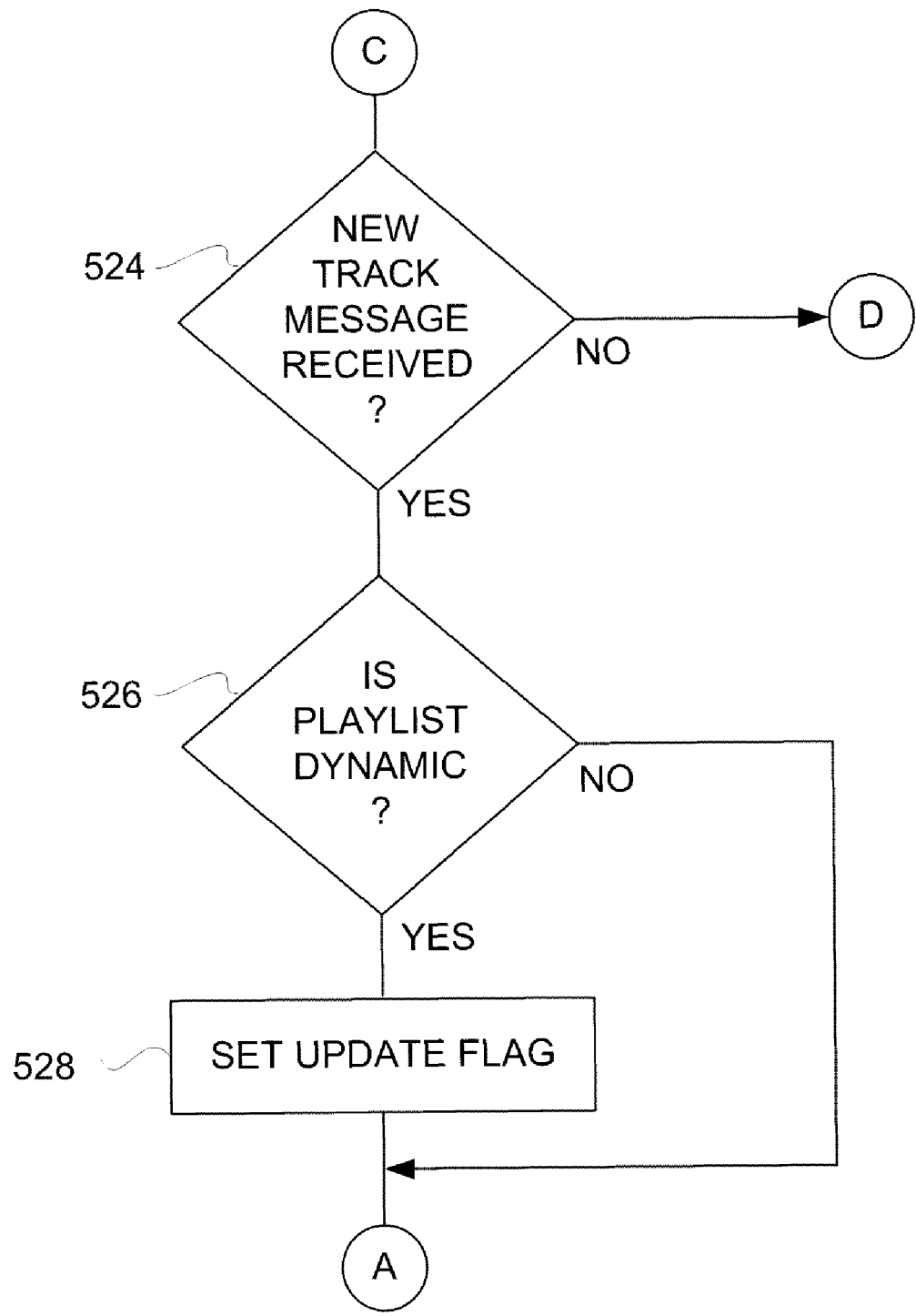
Figure 5D:
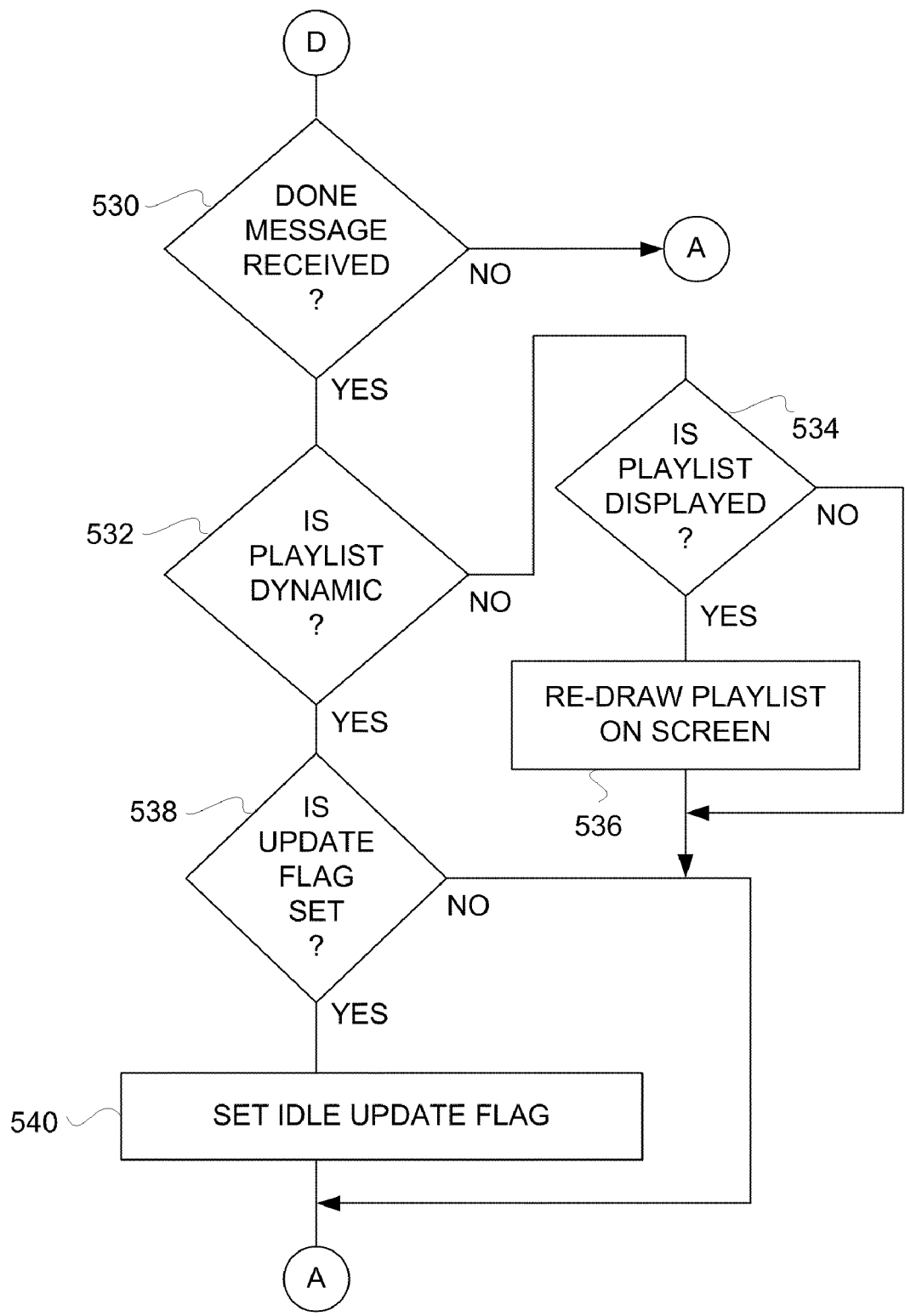

FIG. 4 is a flow diagram of inter-process messaging 400 according to one embodiment of the invention. The inter-process messaging 400 is, for example, performed by a message sender, such as the message sender provided within the track data 352 illustrated in FIG. 3B.

The inter-process messaging 400 begins with a decision 402 that determines whether a track has been modified. When the decision 402 determines that a track has been modified, then a modification message is sent 404. On the other hand, when the decision 402 determines that a track has not been modified, then a decision 406 determines whether a track has been added. When the decision 406 determines that a track has been added, then a new track message is sent 408. Alternatively, when the decision 406 determines that a track has not been added, then a decision 410 determines whether a track has been deleted. When the decision 410 determines that a track has been deleted, then a track deleted message is sent 412. Following the operations 404, 408, 410 (when a track is not being deleted), and 412 (when a track is being deleted), a decision 414 determines whether the inter-process messaging 400 is done with a set of changes. For example, when a set of changes are being made (e.g., a set of tracks being modified, added or deleted), the changes can be processed as a set for more efficient processing. Hence, the decision 414 determines whether a set of changes has been completed. When the decision 414 determines that the inter-process messaging is done with a set of changes, then a done message is sent 416. Following the operation 416, the inter-process messaging 400 returns to repeat the decision 402 and subsequent blocks. Alternatively, when the decision 414 determines that the inter-process messaging 400 is not done with a set of changes, then the inter-process messaging 400 returns directly to repeat the decision 402 and subsequent blocks (thereby bypassing the operation 416).

FIGS. 5A-5D are flow diagrams of message update processing 500 according to one embodiment of the invention. The message update processing 500 processes messages being received, such as the modification message, the new track message, and the track deleted message discussed above with respect to FIG. 4.

The message update processing 500 begins with a decision 502 that determines whether a modification message has been received. When the decision 502 determines that a modification message has been received, then a decision 504 determines whether the playlist being processed is dynamic. When the decision 504 determines that the playlist is dynamic, then a decision 506 determines whether an update flag is set. When the decision 506 determines that an update flag is not set, then a modification message mask is compared 508 with a fields mask for the playlist. The fields mask, for example, can be provided within the playlist information for the playlist. The modification message mask can be provided with the modification message that has been received. The comparison indicates whether any one or more fields of the tracks being modified are fields that are utilized by the playlist.

A decision 510 then determines whether there are any matching fields between the modification message mask and the fields mask. When the decision 510 determines that there are matching fields, then an update flag is set 512. The update flag is a flag that indicates that the dynamic playlist is affected by the modification associated with the modification message, and thus the dynamic playlist should be updated. Alternatively, when the decision 510 determines that there are no matching fields, then the dynamic playlist need not be updated and thus the operation 512 is bypassed. Still further, when the decision 504 determines that the playlist is not dynamic or when the decision 506 determines that the update flag is already set, then the message update processing 500 returns to repeat the decision 502 and subsequent operations. Following the operation 512, the message update processing 500 also returns to repeat the decision 502 and subsequent operations.

On the other hand, when the decision 502 determines that a modification message has not been received, then a decision 514 determines whether a track deleted message has been received. When the decision 514 determines that a track deleted message has been received, then a decision 516 determines whether the deleted track is in the playlist being processed. When the decision 516 determines that the deleted track is in the playlist, then the reference (e.g., pointer) to the deleted track is removed 518 from the playlist, thereby removing the data structure which associated the deleted track from the playlist. Next, a decision 520 determines whether the playlist is dynamic. When the decision 520 determines that the playlist is dynamic, an update flag is set 522. Alternatively, when the decision 520 determines that the playlist is not dynamic, the operation 522 is bypassed. On the other hand, when the decision 516 determines that the deleted track is not in the playlist, then the operations 518-522 are bypassed. Hence, following the operation 522, or its being bypassed, the message update processing 500 returns to repeat the decision 502 and subsequent operations.

Still further, when the decision 514 determines that a track deleted message has not been received, then a decision 524 determines whether a new track message has been received. When the decision 524 determines that a new track message has been received, then a decision 526 determines whether the playlist being processed is dynamic. When the decision 526 determines that the playlist is dynamic, then an update flag is set 528. Alternatively, when the decision 526 determines that the playlist is not dynamic, then the operation 528 is bypassed. Following the operation 528 or its being bypassed, the message update processing 500 returns to the beginning of the message update processing 500 to repeat the decision 502 and subsequent operations.

Finally, when the decision 524 determines that a new track message has not been received, then a decision 530 determines whether a done message has been received. When the decision 530 determines that a done message has been received, then a decision 532 determines whether the playlist being processed is a dynamic playlist. When the decision 532 determines that the playlist is not dynamic, then a decision 534 determines whether the playlist is being displayed. When the decision 534 determines that the playlist is being displayed, then the playlist is re-drawn 536 on the screen. Alternatively, when the decision 534 determines that the playlist is not being displayed, the operation 536 is bypassed.

On the other hand, when the decision 532 determines that the playlist is dynamic, then a decision 538 determines whether the update flag has been set. When the decision 538 determines that the update flag is set, then an idle update flag is set 540. Here, the idle update flag is a flag to indicate that during idle processing, the dynamic playlist should be updated. By performing the updating to dynamic playlist in the idle processing, the somewhat intensive computations/processes being performed are able to be done in a background mode without impacting the user's perceived performance of the computing device (e.g., media system). Alternatively, when the decision 538 determines that the update flag is not set, or following the operation 536 or the decision 534 when the playlist is not dynamic, the message update processing 500 returns to repeat the decision 502 and subsequent operations.

Figure 6:
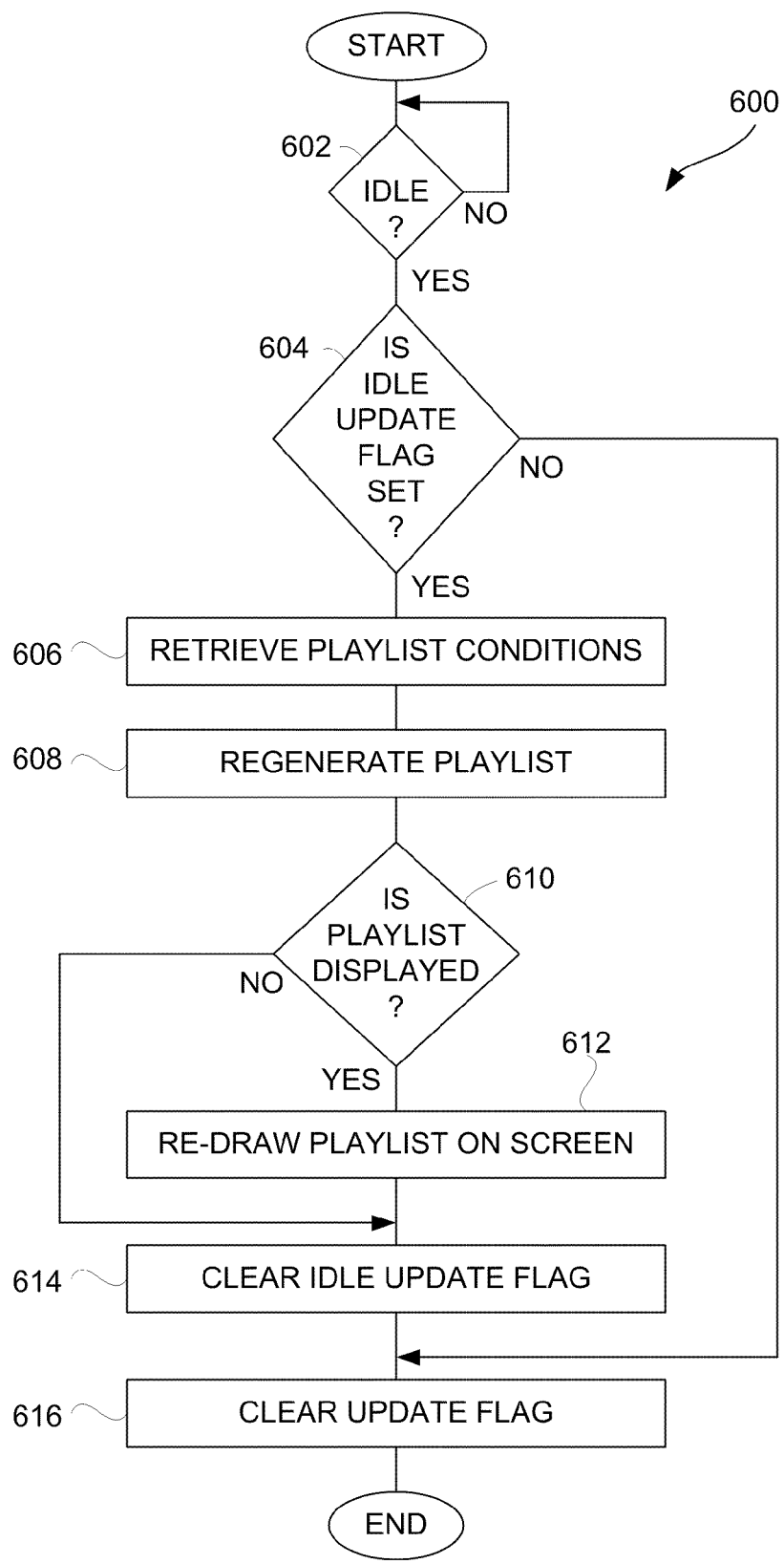
FIG. 6 is a flow diagram of idle update processing according to one embodiment of the invention.

FIG. 6 is a flow diagram of idle update processing 600 according to one embodiment of the invention. The idle update processing 600 begins with a decision 602 that determines whether the computing device is in an idle state. When the decision 602 determines that the computing device is not in an idle state, then the idle update processing 600 awaits such a state. In other words, the idle update processing 600 is invoked when the computing device reaches an idle state.

Once the computing device has reached an idle state, a decision 604 determines if the idle update flag is set. When the decision 604 determines that the idle update flag is set, playlist conditions are retrieved 606. The playlist conditions being retrieved 606 are associated with a particular playlist that is being processed. After the playlist conditions have been retrieved 606, the playlist is regenerated 608. Next, a decision 610 determines if the playlist is being displayed. When the decision 610 determines that the playlist is being displayed, the playlist is re-drawn 612 on the screen of the computing device. Alternatively, when the decision 610 determines that the playlist is not being displayed, the operation 612 is bypassed. Following the operation 612, or its being bypassed, the idle update flag is cleared 614. Following the operation 614, as well as following the decision 604 when the idle update flag is not set, the update flag is cleared 616. After the update flag has been cleared 616, the idle update processing 600 is complete and ends.

Figure 7A:
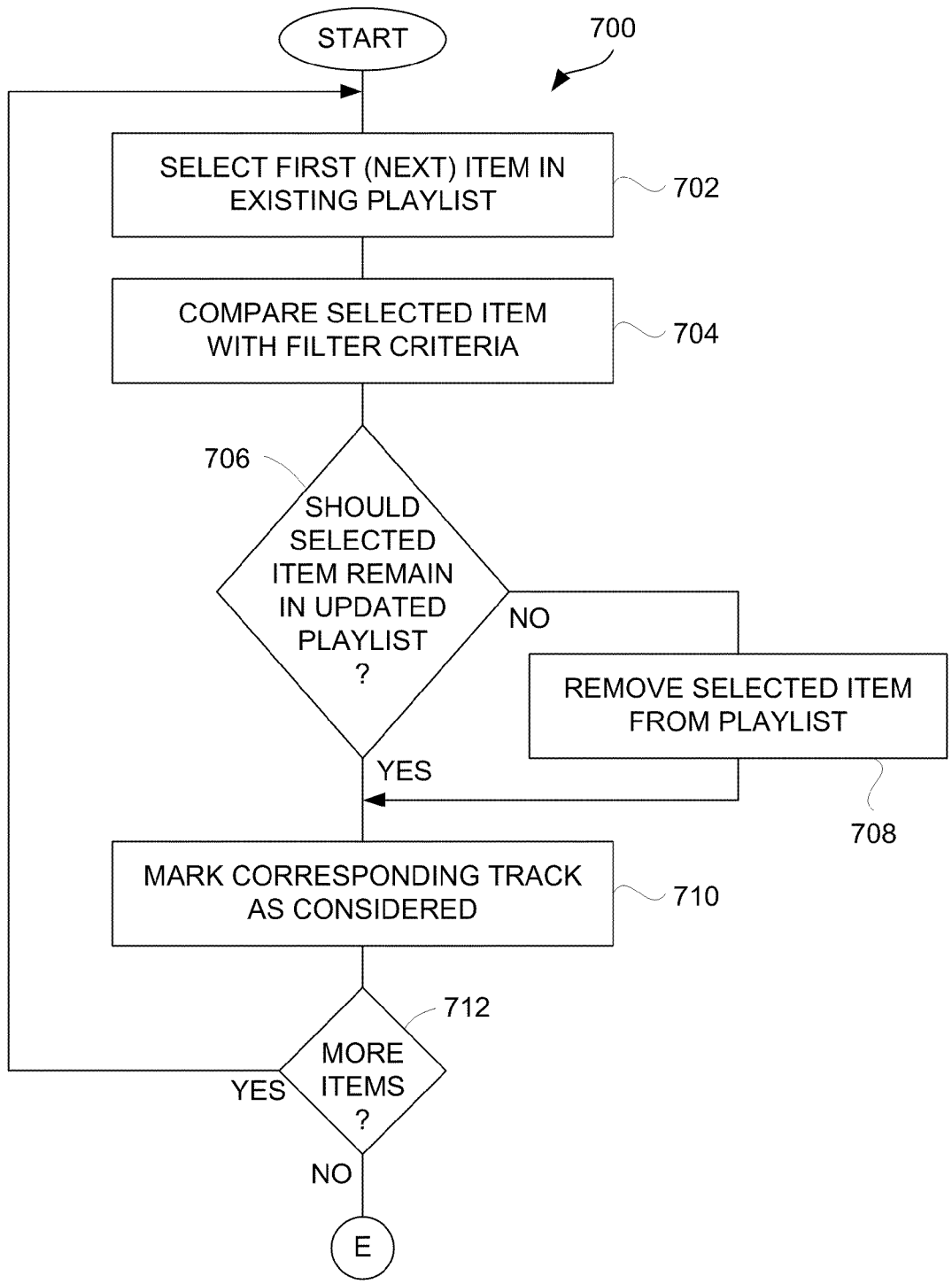
FIGS. 7A-7C are flow diagrams of regenerate playlist processing according to one embodiment of the invention.
Figure 7B:
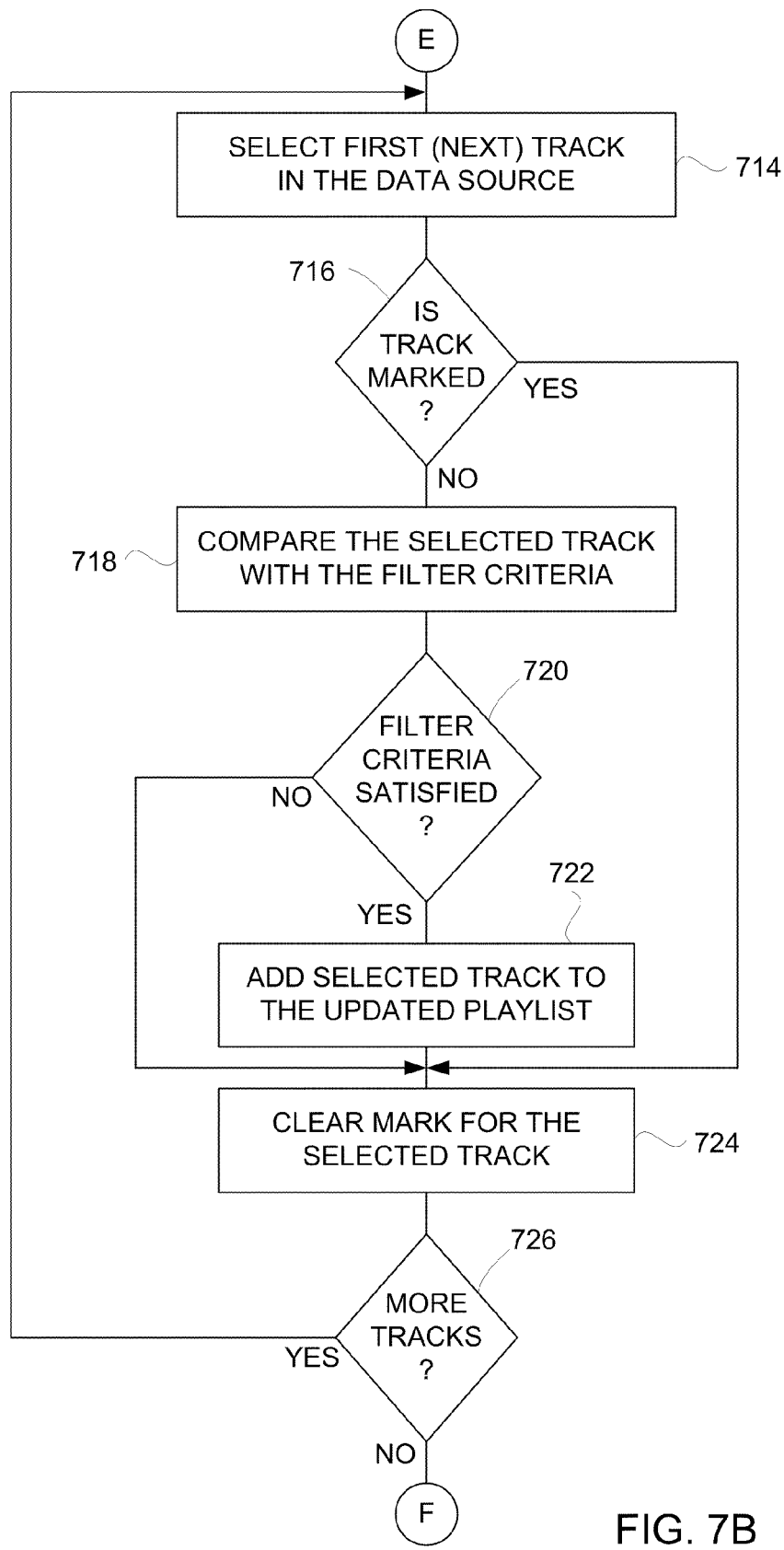
Figure 7C:
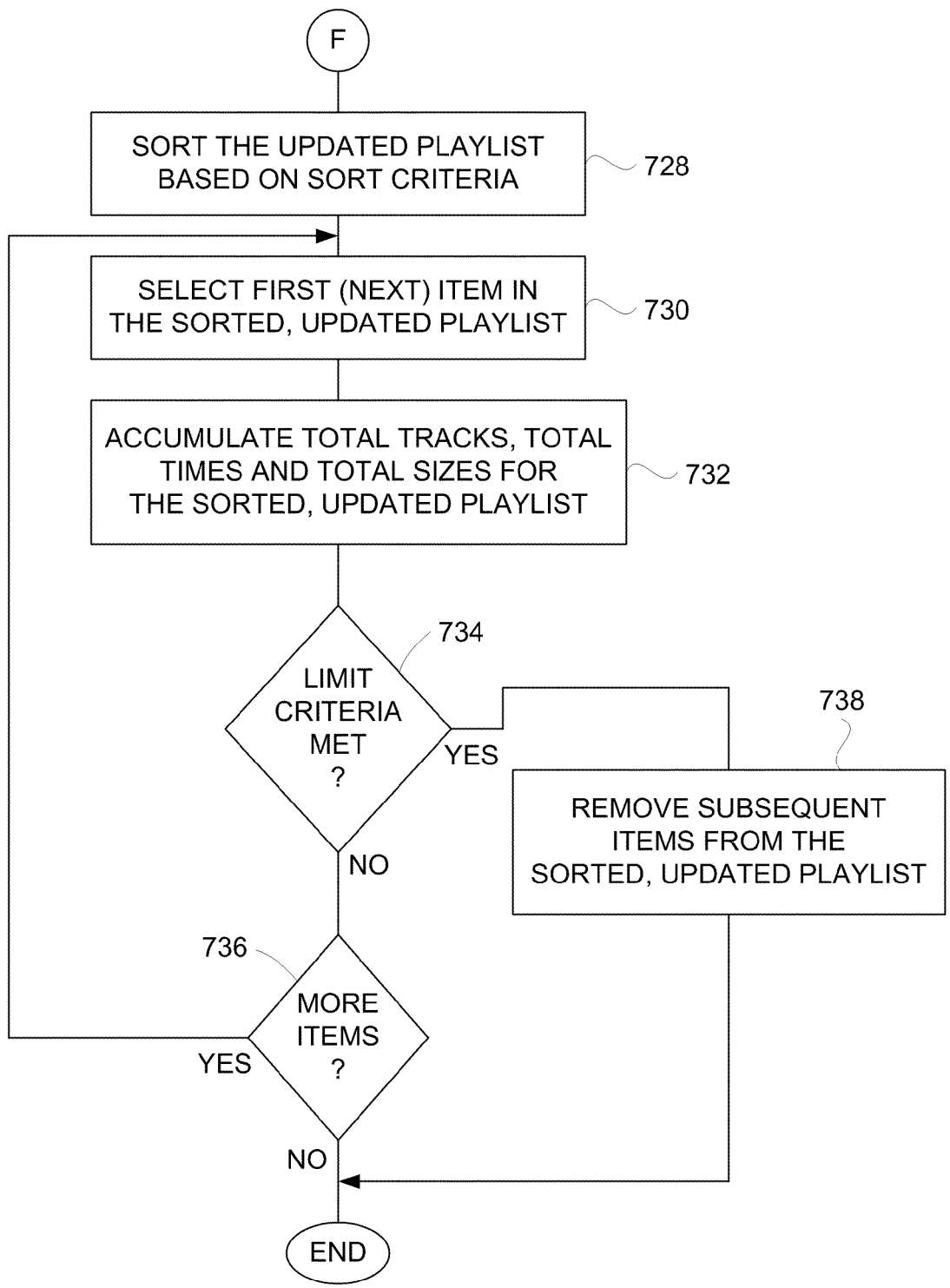

FIGS. 7A-7C are flow diagrams of regenerate playlist processing 700 according to one embodiment of the invention. The regenerate playlist processing 700 is, for example, processing performed by the regeneration 608 of the playlist in FIG. 6 or the regeneration 308 of the playlist illustrated in FIG. 3A.

The regenerate playlist processing 700 begins by selecting 702 a first item in the existing playlist that is being regenerated. Next, the selected item in the existing playlist is compared 704 with filter criteria. The filter criteria is a part of the playlist conditions for the existing playlist. Next, a decision 706 determines whether the selected item should remain in the updated playlist. When the decision 706 determines that the selected item should not remain in the updated playlist, then the selected item is removed 708 from the playlist. On the other hand, when the decision 706 determines that the selected item should remain in the playlist, then the corresponding track to the selected item is marked 710 as having been considered. Next, a decision 712 determines whether there are more items in the existing playlist to be processed. When the decision 712 determines that there are more items in the existing playlist to be considered, the regenerate playlist processing 700 returns to repeat the operation 702 so that a next item in the existing playlist can be selected.

Alternatively, when the decision 712 determines that there are no more items to be processed, additional processing is performed with respect to the data source associated with the playlist. More particularly, a first track in the data source is selected 714. Then, a decision 716 determines whether the selected track is marked. When the decision 716 determines that the selected track is not marked, then the selected track is compared 718 with the filter criteria. A decision 720 then determines whether the filter criteria is satisfied. When the decision 720 determines that the filter criteria is satisfied, the selected track is added 722 to the updated playlist. When the decision 720 determines that the filter criteria is not satisfied, then the operation 722 is bypassed so that the selected track is not added to the updated playlist. Further, when the decision 716 determines that the selected track is marked, then the operations 718-722 are bypassed because the particular track has already been processed and thus already either exists in the updated playlist or has been removed therefrom.

Next, the mark for the selected track is cleared 724. Here, the mark may not have previously been set, but nevertheless the mark can be cleared 724 or this operation could be bypassed. A decision 726 then determines whether there are more tracks in the data source to be processed. When the decision 726 determines that there are more tracks in the data source to be processed, the regenerate playlist processing 700 returns to repeat the operation 714 and subsequent operations.

On the other hand, when the decision 726 determines that there are no more tracks to be processed, the updated playlist is sorted 728 based on the sort criteria, which is another part of the playlist conditions. After the updated playlist has been sorted 728, a first item in the sorted, updated playlist is selected 730. Then, one or more of total tracks, total times and total sizes for the items in the sorted, updated playlist are accumulated 732 as they are processed. A decision 734 then determines whether limit criteria has been met, which are also provided by the playlist conditions. In one embodiment, the limit criteria can include the sort criteria. When the decision 734 determines that the limit criteria has not been met, then a decision 736 determines whether there are more items in the sorted, updated playlist to be processed. When the decision 736 determines that there are more items in the sorted, updated playlist to be processed, the regenerate playlist processing 700 returns to repeat the operation 730 and subsequent operations so that a next item can be selected and thereafter processed.

Alternatively, when the decision 734 determines that the limit criteria has been met, then all subsequent items are removed 738 from the sorted, updated playlist. Here, the balance of the sorted, updated playlist is removed therefrom as the limit criteria for the playlist has been met. Following the operation 738 or following the decision 736 when there are no more items to be processed, the regenerate playlist processing 700 is complete and ends.

As noted above, the playlist conditions can provide filter criteria, sort criteria and limit criteria. These criteria can be associated with the media information or track information for the media items. In one embodiment, the filter criteria might require a field of the track information to include or not include a particular alphanumeric string (i.e., string comparison). In another embodiment, the filter criteria might require a field of the track information include a numeric value less than, equal to, or greater than a particular numeric value (i.e., numeric comparison). In one embodiment, the sort criteria might be random, alphabetical, most recently played, rating, etc. In one embodiment, the limit criteria can be a numerical limit imposed on the length of the playlist. Such a limit can be with respect to a field of the track information. For example, the limit criteria could require that the playlist be limited to twenty-five (25) media items (e.g., tracks or songs) or two (2) hours of media play time.

Figure 8:
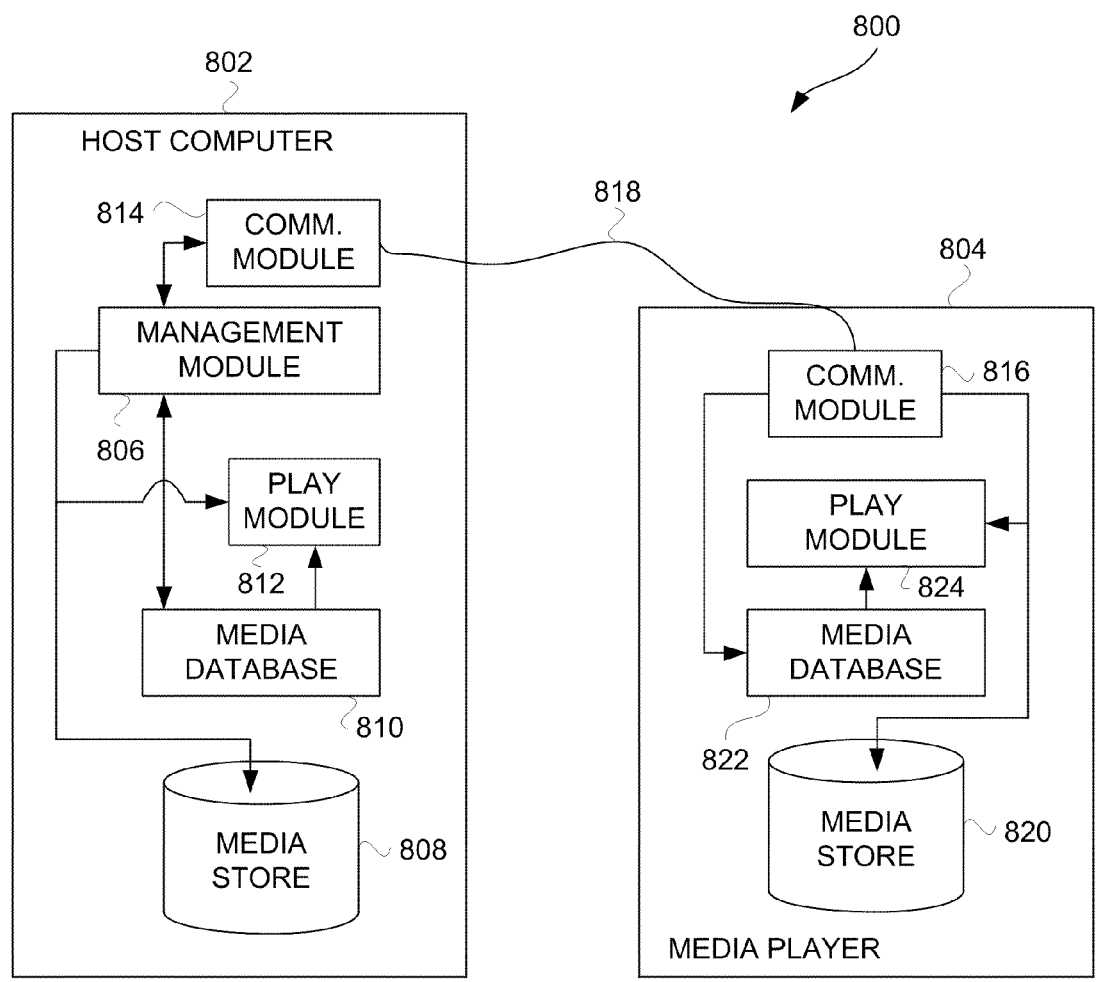
FIG. 8 is a block diagram of a media management system according to another embodiment of the invention.

FIG. 8 is a block diagram of a media management system 800 according to another embodiment of the invention. The media management system 800 includes a host computer 802 and a media player 804. The host computer 802 is typically a personal computer. The host computer, among other conventional components, includes a management module 806 which is a software module. The management module 806 provides for centralized management of media items and playlists on the host computer 802. The management module 806 may also indirectly provide centralized management of media items and playlists on the media player 804. More particularly, the management module 806 manages those media items stored in a media store 808 associated with the host computer 802. The management module 806 also interacts with a media database 810 to store media information and playlists associated with the media items stored in the media store 808. These playlists can be dynamic or non-dynamic.

The media information pertains to characteristics or attributes of the media items (and thus can be considered part of the media content). For example, in the case of audio or audiovisual media, the media information can include one or more of: title, album, track number, artist, composer and genre. The media information can also include year, duration (time) and rating. These types of media information are specific to particular media items. In addition, the media information can pertain to quality characteristics of the media items. Examples of quality characteristics of media items can include one or more of: bit rate, sample rate, equalization setting, and volume adjustment.

The playlists are lists of particular media items. The particular media items for the playlists can be selected automatically using rules (e.g., playlist conditions) or can be manually selected through user interaction with a graphical user interface. The playlists that have their media items selected by rules can be automatically updated (i.e., dynamic) when appropriate so as to maintain its compliance with the rules when the media items available to the host computer 802 change.

Still further, the host computer 802 includes a play module 812. The play module 812 is a software module that can be utilized to play certain media items stored in the media store 808. The play module 812 can also display (on a display screen) or otherwise utilize media information from the media database 810. Typically, the media information of interest corresponds to the media items to be played by the play module 812.

The host computer 802 can also include a communication module 814 that couples to a corresponding communication module 816 within the media player 804. A connection or link 818 removeably couples the communication modules 814 and 816. In one embodiment, the connection or link 818 is a data bus, such as a FIREWIRE bus or USB bus, which is well known in the art.

The media player 804 can also include a media store 820 that stores media items within the media player 804. The media items being stored to the media store 820 are typically received over the connection or link 818 from the host computer 802. More particularly, the management module 806 sends all or certain of those media items residing on the media store 808 over the connection or link 818 to the media store 820 within the media player 804. Additionally, the corresponding media information for the media items that is delivered to the media player 804 from the host computer 802 can be stored in a media database 822. In this regard, certain media information from the media database 810 within the host computer 802 can be sent to the media database 822 within the media player 804 over the connection or link 818.

Still further, playlists identifying certain of the media items can also be sent by the management module 806 over the connection or link 818 to the media store 820 or the media database 822 within the media player 804. In one embodiment, the media player 804 has limited or no capability to manage playlists on the media player 804. However, the management module 806 within the host computer 802 through management of the playlists residing on the host computer can indirectly manage the playlists residing on the media player 804. In this regard, additions, deletions or changes to playlists can be performed on the host computer 802 and then be carried over to the media player 804 when delivered thereto.

Furthermore, the media player 804 includes a play module 824 that couples to the media store 820 and the media database 822. The play module 824 is a software module that can be utilized to play certain media items stored in the media store 820. The play module 824 can also display (on a display screen) or otherwise utilize media information from the media database 822. Typically, the media information of interest corresponds to the media items to be played by the play module 824.

Hence, in one embodiment, the media player 804 has limited or no capability to manage media items on the media player 804. However, the management module 806 within the host computer 802 can indirectly manage the media items and playlists residing on the media player 804. For example, to "add" a media item to the media player 804, the management module 806 serves to identify the media item to be added to the media player 804 from the media store 808 and then causes the identified media item to be delivered to the media player 804. As another example, to "delete" a media item from the media player 804, the management module 806 serves to identify the media item to be deleted from the media store 808 and then causes the identified media item to be deleted from the media player 804. As still another example, if changes (i.e., alterations) to characteristics of a media item were made at the host computer 802 using the management module 806, then such characteristics can also be carried over to the corresponding media item on the media player 804. In one implementation, the additions, deletions and/or changes occur in a batch-like process during synchronization of the media items on the media player 804 with the media items on the host computer 802.

Figure 9:
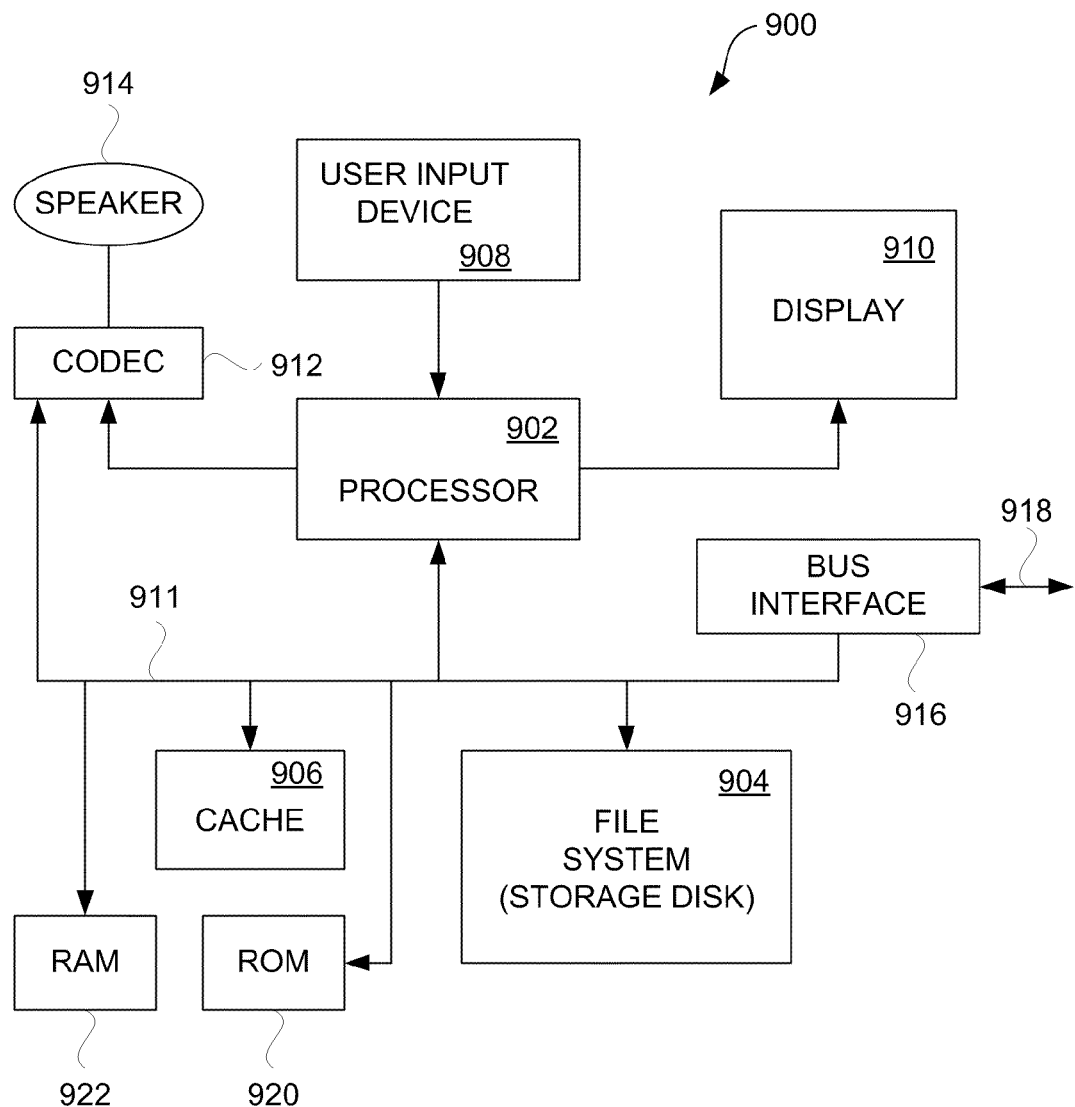
FIG. 9 is a block diagram of a media player according to one embodiment of the invention.

FIG. 9 is a block diagram of a media player 900 according to one embodiment of the invention. The media player 900 includes a processor 902 that pertains to a microprocessor or controller for controlling the overall operation of the media player 900. The media player 900 stores media data pertaining to media items in a file system 904 and a cache 906. The file system 904 is typically a storage disk or a plurality of disks. The file system 904 typically provides high capacity storage capabilities for the media player 900. However, since the access time to the file system 904 is relatively slow, the media player 900 can also include a cache 906. The cache 906 is, for example, Random-Access Memory (RAM) provided by semiconductor memory. The relative access time to the cache 906 is substantially shorter than for the file system 904. However, the cache 906 does not have the large storage capacity of the file system 904. Further, the file system 904, when active, consumes more power than does the cache 906. The power consumption is often a concern when the media player 900 is a portable media player that is powered by a battery (not shown). The media player 900 also includes a RAM 920 and a Read-Only Memory (ROM) 922. The ROM 922 can store programs, utilities or processes to be executed in a non-volatile manner. The RAM 920 provides volatile data storage, such as for the cache 906.

The media player 900 also includes a user input device 908 that allows a user of the media player 900 to interact with the media player 900. For example, the user input device 908 can take a variety of forms, such as a button, keypad, dial, etc. Still further, the media player 900 includes a display 910 (screen display) that can be controlled by the processor 902 to display information to the user. A data bus 911 can facilitate data transfer between at least the file system 904, the cache 906, the processor 902, and the CODEC 912.

In one embodiment, the media player 900 serves to store a plurality of media items (e.g., songs) in the file system 904. When a user desires to have the media player play a particular media item, a list of available media items is displayed on the display 910. Then, using the user input device 908, a user can select one of the available media items. The processor 902, upon receiving a selection of a particular media item, supplies the media data (e.g., audio file) for the particular media item to a coder/decoder (CODEC) 912. The CODEC 912 then produces analog output signals for a speaker 914. The speaker 914 can be a speaker internal to the media player 900 or external to the media player 900. For example, headphones or earphones that connect to the media player 900 would be considered external speakers.

The media player 900 also includes a bus interface 916 that couples to a data link 918. The data link 918 allows the media player 900 to couple to a host computer.

In creating a playlist, a user can interact with a graphical user interface. The graphical user interface can be provided by, or associated with, a software application that manages media items and their playlists. Such a software application can, for example, be provided by the media manager 106 illustrated in FIG. 1A, the media manager 156 illustrated in FIG. 1B, the media application 202 illustrated in FIG. 2, or the management module 806 illustrated in FIG. 8. The specifics of the graphical user interface can vary with implementation.

Figure 10A:
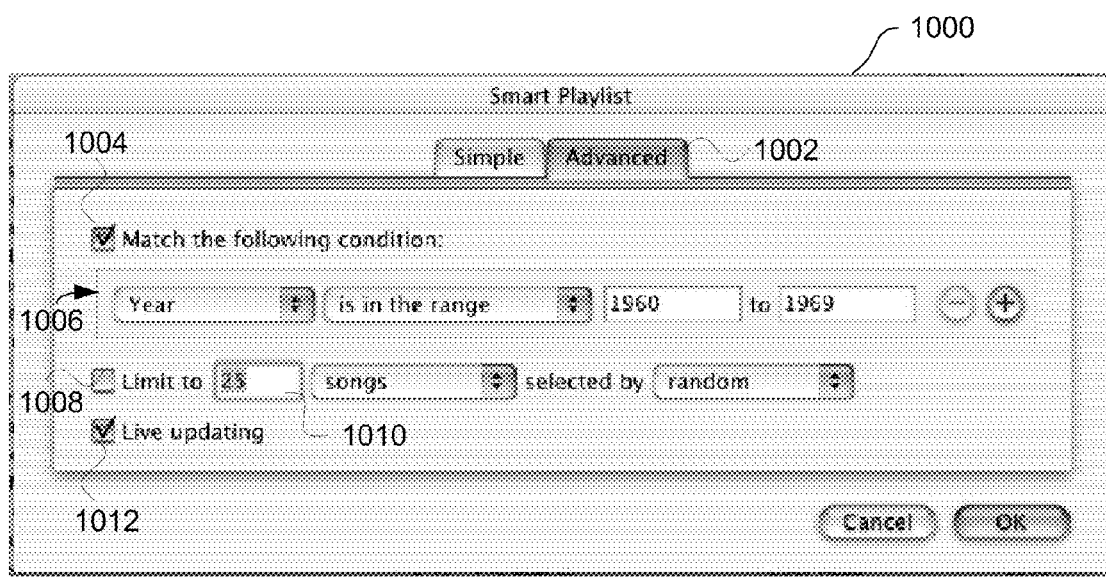
FIGS. 10A-10C are screen shots of exemplary graphical user interfaces for a user to create a playlist.
Figure 10B:
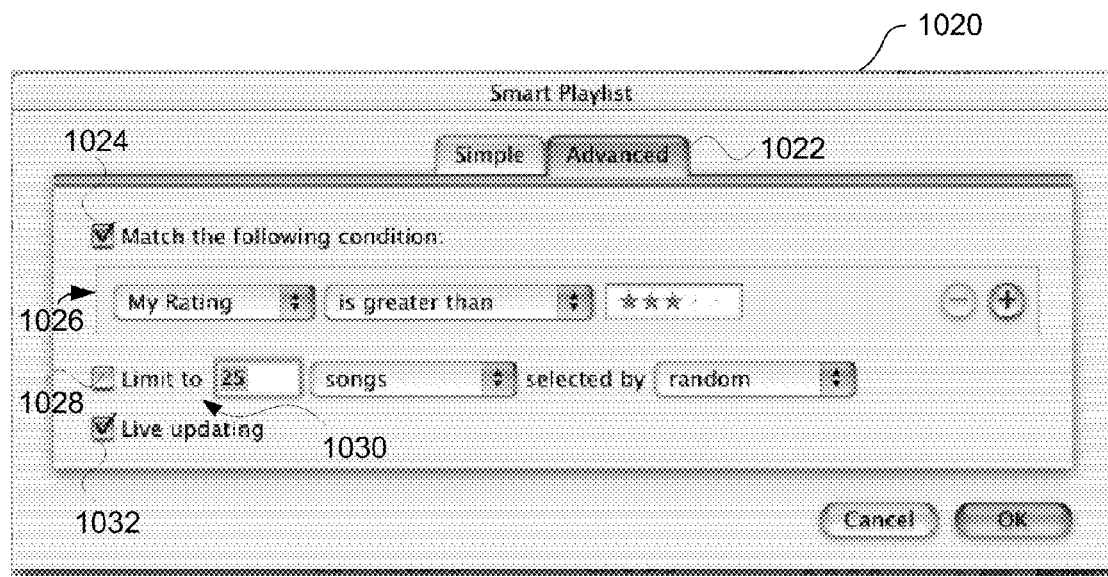
Figure 10C:

FIGS. 10A-10C are screen shots of exemplary graphical user interfaces for a user to create a playlist. These exemplary graphical user interfaces define the rules or playlist conditions for the playlist to be created.

FIG. 10A is a screen shot of a first exemplary graphical user interface 1000. The first exemplary graphical user interface 1000 facilitates creation of a first playlist using an advanced interface 1002. The advanced interface 1002 allows a user to enable filter conditions with a check box 1004. When the check box 1004 is checked, filter conditions can be established at a filter conditions entry region 1006. Typically, the filter conditions pertain to media information associated with the media items. In one implementation, the media information can be the fields of the track information of the media database shown in FIG. 3B. In this example, the filter conditions are based on a year (of creation) for media items. Specifically, the filter conditions selected or entered by the user are to select those media items that were created between the years 1960 to 1969 (e.g., 60s music). The advanced interface 1002 also allows the user to enable limit conditions with a check box 1008. When the check box 1008 is checked, limit conditions can be established at a limit condition entry region 1010. Although not enabled in this example, a limit condition can limit the number of media items (e.g., songs) in the resulting playlist and also determine the manner in which the limiting should be performed. Still further, the advanced interface 1002 allows the user to enable live updating (i.e., dynamic updating) with a check box 1012. In this example, the live updating is enabled so that the resulting playlist will be automatically updated as discussed in detail above.

FIG. 10B is a screen shot of a second exemplary graphical user interface 1020. The second exemplary graphical user interface 1020 facilitates creation of a second playlist using an advanced interface 1022. The second exemplary graphical user interface 1020 is similar to the first exemplary graphical user interface 1000 except that the filter conditions being used are different. The advanced interface 1022 allows a user to enable filter conditions with a check box 1024. When the check box 1024 is checked, filter conditions can be established at a filter conditions entry region 1026. In this example, the filter conditions are based on a user rating of the media items (e.g., 1, 2, 3, 4 or 5 star rating). Specifically the filter conditions selected or entered by the user are used to select those media items that were rated as greater than a 3 star rating. The advanced interface 1022 also allows the user to enable limit conditions with a check box 1028. When the check box 1028 is checked, limit conditions can be established at a limit condition entry region 1030. Although not enabled in this example, the limit conditions can limit the number of media items (e.g., songs) in the resulting playlist and can also determine the manner in which the limiting should be performed. Still further, the advanced interface 1022 allows the user to enable live updating (i.e., dynamic updating) with a check box 1032. In this example, the live updating is enabled so that the resulting playlist will be automatically updated as discussed in detail above.

FIG. 10C is a screen shot of a third exemplary graphical user interface 1040. The third exemplary graphical user interface 1040 facilitates creation of a third playlist using a simple interface 1042. The simple interface 1042 is less complex than the advanced interface noted above. The simple interface 1042 allows a user to enable filter conditions with a check box 1044. When the check box 1044 is checked, filter conditions can be established by selecting a field from a list of fields 1046 and entering text into a text box 1048 to be contained within the selected field. For example, the fields can be those fields of the media information, such as the fields of the track information of the media database shown in FIG. 3B. In the example shown in FIG. 10C, the selected field is "Artist" and the entered text is "Pink Floyd, Aerosmith." Hence, the resulting playlist would include all media items (i.e., music tracks) available that have Pink Floyd or Aerosmith as their artist. The simple interface 1042 also allows the user to enable limit conditions with a check box 1050. When the check box 1050 is checked, limit conditions can be established at a limit condition entry region 1052. Although not enabled in this example, the limit conditions can limit the number of media items (e.g., songs) in the resulting playlist and can also determine the manner in which the limiting should be performed. Still further, the simple interface 1042 allows the user to enable live updating (i.e., dynamic updating) with a check box 1054. In this example, the live updating is enabled so that the resulting playlist will be automatically updated as discussed in detail above.

Figure 11A:
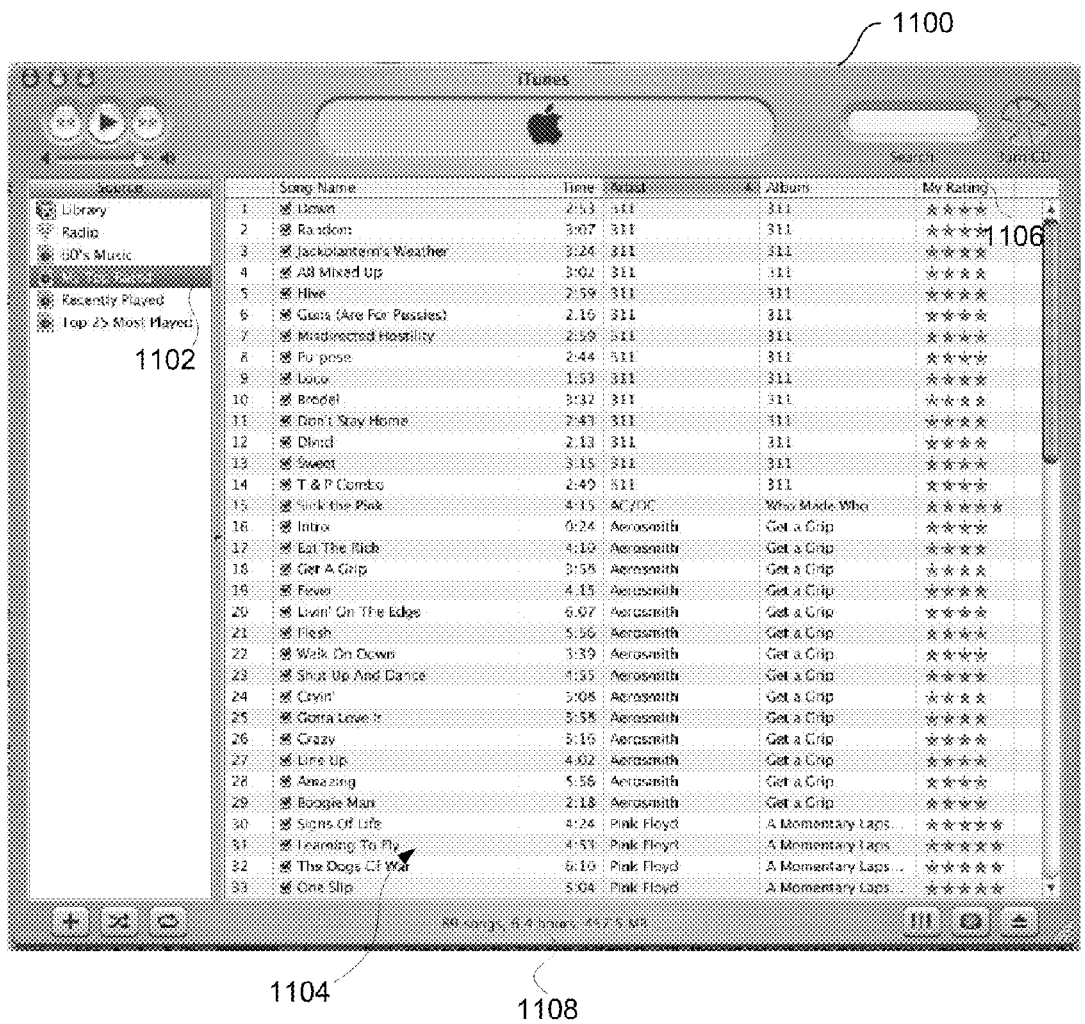
Figure 11B:
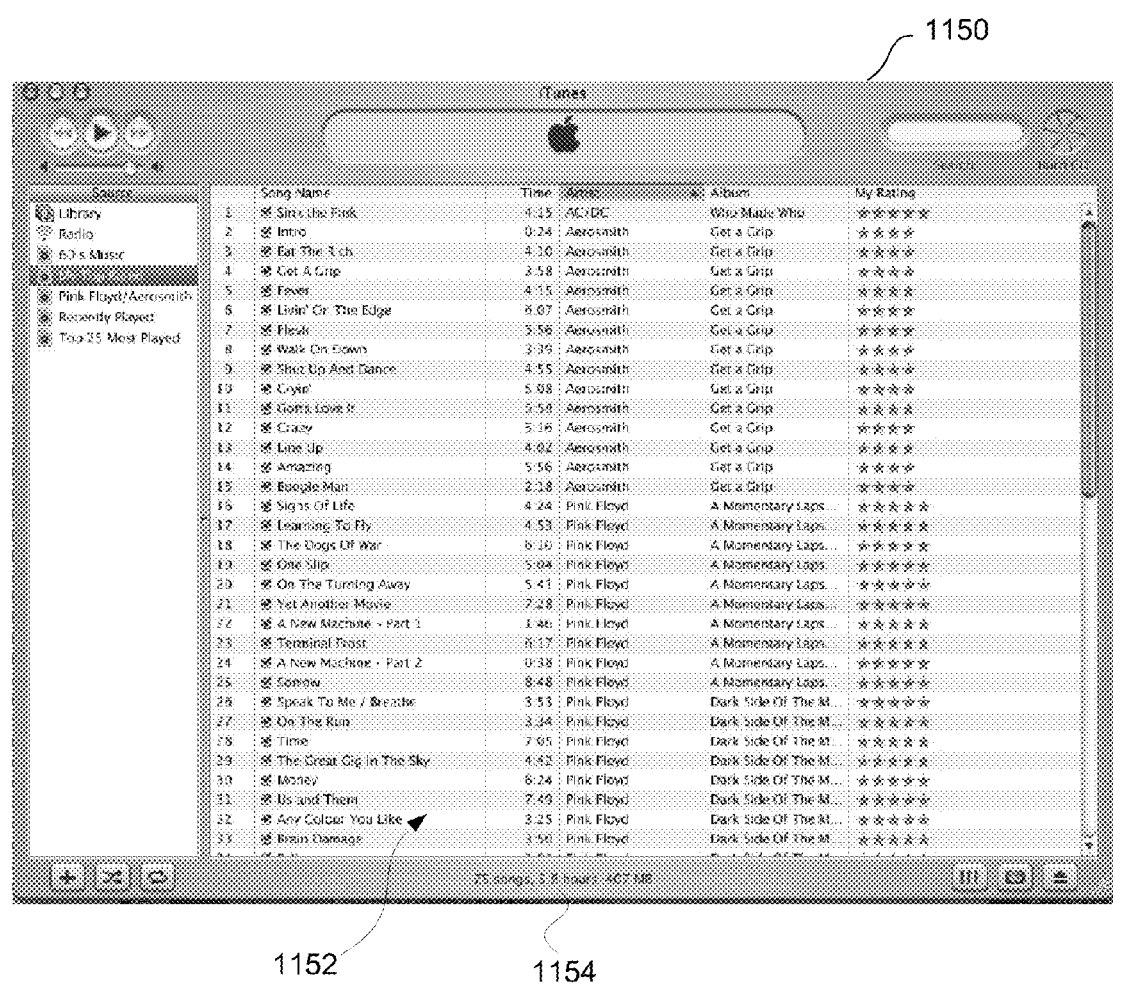

FIGS. 11A and 11B are screen shots of media items of exemplary playlists formed using the graphical user interface 1020 shown in FIG. 10B. In FIG. 11A, a screen shot 1100 depicts a playlist ("My Top Rated") as a source 1102 and a list 1104 of the media items in the playlist. Note that the star ratings in the "My Rating" field for each of the media items in the list 1104 are all greater than a 3-star rating. A size indication 1108 indicates that the playlist has 85 songs, has a play time of 6.4 hours, and consumes 457.5 MBs of data storage. As an example of live (or dynamic) updating of the playlist ("My Top Rated"), assume that after the playlist shown in FIG. 11A is created, the source ("library") is altered by the user demoting the star rating of all media items by artist "311" to 3-stars. Previously, as shown in FIG. 11A, these media items had a 4-star rating. Hence, once these rating changes were made, the media items from artist "311" no longer satisfy the playlist conditions (e.g., filter criteria) for the playlist ("My Top Rated"). Accordingly, following the automatic updating of the playlist ("My Top Rated"), the updated playlist no longer includes the artist "311" media items. FIG. 11B depicts a screen shot 1150 depicts the playlist ("My Top Rated") after the automatic updating has been performed. The listing 1152 of the media items indeed no longer include any of the media items from artist "311". This is achieved without any user actions to alter the playlist. A size indication 1154 for the updated playlist indicates that the playlist now has 75 songs, has a play time of 5.8 hours, and consumes 407 MBs of data storage.

Although the media items of emphasis in several of the above embodiments were audio items (e.g., audio files or songs), it should be understood that the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that playlists are able to be updated so as to remain current with respect to available media items. Another advantage of the invention is that playlists are able to be automatically updated without user interaction. Still another advantage of the invention is that a graphical user interface can be used to assist a user in creating playlists that can be dynamically updated based on user-specified rules (e.g., filter, sort and limit criteria).

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A non-transitory computer readable storage medium including at least computer program code stored thereon for automatically updating a list of media items maintained by a media system, said computer readable medium comprising:
   computer program code for automatically determining whether at least one new media item has been added to a media content library available to the media system;
   computer program code for determining whether the list of media items is affected by the addition of the at least one media item to the media content library available to the media system; and
   computer program code for regenerating the list of media items when said computer program code for determining determines that at least one new media item has been added to the media content library available to the media system,
   wherein said computer program code for regenerating operates to regenerate the list of media items after said computer program code for determining determines that the list of media items is affected by the addition of the at least one media item to the media content library available to the media system, and
   wherein said computer program code for regenerating is initiated without user interaction to initiate such regeneration.

2. A non-transitory computer readable storage medium as recited in claim 1, wherein the list of media items has at least one list condition associated therewith, and
   wherein said computer program code for regenerating operates to regenerate the list of media items using the at least one list condition.

3. A non-transitory computer readable storage medium as recited in claim 1,
   wherein the list of media items has at least one list condition associated therewith, the at least one condition referencing at least one field, and
   wherein said computer program code for determining whether the list of media items is affected by the addition of the at least one media item to the media content library available to the media system comprises computer program code for evaluating whether one or more fields of the at least one media item that has been added to the media content library available to the media system has been altered with reference to the at least one field referenced by the at least one condition associated with the list of media items.

4. A non-transitory computer readable storage medium as recited in claim 3, wherein said computer program code for regenerating operates to regenerate the list of media items using the at least one list condition.

5. A non-transitory computer readable storage medium as recited in claim 1, wherein said computer readable medium further comprises:
 computer program code for subsequently displaying the list of media items after being regenerated.

6. A non-transitory computer readable storage medium including at least computer program code stored thereon for providing an updated playlist from a client computer to a portable media player, said computer readable medium comprising:
 computer program code for determining whether an updated playlist is available to be provided from a client computer to the portable media player; and
 computer program code for electronically delivering the updated playlist from the client computer to the portable media player when a data connection is available between the client computer and the portable media player,
 wherein the updated playlist is maintained at the client computer, the client computer being configured to automatically determine whether at least one new media item has been added to a media content library, determine whether a dynamic playlist is affected by the addition of the at least one media item to the media content library, and regenerate the dynamic playlist, thereby producing the updated playlist, when it is determined that the dynamic playlist is affected by the addition of the at least one media item to the media content library, and
 wherein the dynamic playlist is regenerated without user interaction to initiate such regeneration.

7. A non-transitory computer readable storage medium as recited in claim 6, wherein the dynamic playlist has playlist conditions associated therewith, the playlist conditions including at least one filter criteria, and
 wherein the regeneration of the dynamic playlist operates to regenerate the dynamic playlist using the at least one filter criteria.

8. A non-transitory computer readable storage medium as recited in claim 6, wherein the dynamic playlist has playlist conditions associated therewith, the playlist conditions including at least one filter criteria and at least one limit criteria, and
 wherein the regeneration of the dynamic playlist operates to regenerate the dynamic playlist using the at least one filter criteria and the at least one limit criteria.

9. A computer-implemented method for automatically updating a playlist on a media play system, said method being performed by the media play system which includes a processor and a memory, said method comprising:
 determining whether new media content has been added to a media content library available to the media play system;
 determining whether the playlist is affected by the addition of the new media content to the media content library available to the media play system; and
 automatically regenerating the playlist when said determining determines that the new media content has been added to the media content library available to the media play system,
 wherein said regenerating is performed after said determining determines that the new media content has been added to the media content library available to the media play system and after said determining determines that the playlist is affected by the addition of the new media content to the media content library available to the media play system, and wherein said regenerating is initiated without user interaction to initiate such regeneration.

10. A computer-implemented method as recited in claim 9, wherein the playlist has at least one playlist condition associated therewith, and
 wherein said regenerating operates to regenerate the playlist using the at least one select playlist condition.

11. A computer-implemented method as recited in claim 9, wherein said method further comprises:
 subsequently displaying the playlist after said regenerating.

12. A computer-implemented method as recited in claim 9, wherein said method further comprises:
 re-drawing the playlist after said regenerating when the playlist is already being displayed.

13. A computer-implemented method as recited in claim 9, wherein the playlist has playlist conditions associated therewith, the playlist conditions including at least one filter criteria, and
 wherein said regenerating operates to regenerate the playlist using the at least one filter criteria.

14. A computer-implemented method as recited in claim 9, wherein the playlist has playlist conditions associated therewith, the playlist conditions including at least one filter criteria and at least one limit criteria, and
 wherein said regenerating operates to regenerate the playlist using the at least one filter criteria and the at least one limit criteria.

15. A computer-implemented method as recited in claim 9, wherein the playlist has playlist conditions associated therewith, the playlist conditions including at least one filter criteria, and
 wherein said regenerating operates to regenerate the playlist using the at least one limit criteria includes or has a sort criteria associated therewith.

16. A computer-implemented method as recited in claim 9, wherein the media content comprises media items and media information.

17. A computer-implemented method as recited in claim 16, wherein the media items pertain to one or more of audio, video or images.

18. A computer-implemented method as recited in claim 9, wherein the media play system comprises a personal computer.

* * * * *